US012245581B2

(12) United States Patent
Kennamer et al.

(10) Patent No.: US 12,245,581 B2
(45) Date of Patent: Mar. 11, 2025

(54) NUISANCE ANIMAL TRAP

(71) Applicants: Jack J. Kennamer, Maineville, OH (US); Pierce M. Kennamer, Boca Raton, FL (US)

(72) Inventors: Jack J. Kennamer, Maineville, OH (US); Pierce M. Kennamer, Boca Raton, FL (US)

(*) Notice: Subject to any disclaimer, the term of this patent is extended or adjusted under 35 U.S.C. 154(b) by 205 days.

(21) Appl. No.: 18/131,152

(22) Filed: Apr. 5, 2023

(65) Prior Publication Data

US 2023/0337654 A1 Oct. 26, 2023

Related U.S. Application Data

(60) Provisional application No. 63/332,717, filed on Apr. 20, 2022.

(51) Int. Cl.
*A01M 23/08* (2006.01)

(52) U.S. Cl.
CPC .................................. *A01M 23/08* (2013.01)

(58) Field of Classification Search
CPC .................................................... A01M 23/08
USPC ............................................................. 43/61
See application file for complete search history.

(56) References Cited

U.S. PATENT DOCUMENTS

| | | | | |
|---|---|---|---|---|
| 147,899 A * | 2/1874 | Carnahan | ............... | A01M 23/08 43/66 |
| 224,960 A * | 2/1880 | Simpson | ............... | A01M 23/08 43/66 |
| 359,237 A * | 3/1887 | White | ............... | A01M 23/08 43/66 |
| 362,343 A * | 5/1887 | White | ............... | A01M 23/08 43/66 |
| 402,585 A * | 5/1889 | Griffin | ............... | A01M 23/08 43/100 |
| 439,991 A * | 11/1890 | Allison | ............... | A01M 23/08 43/100 |
| 986,977 A * | 3/1911 | Harris | ............... | A01M 23/08 43/66 |
| 1,010,256 A * | 11/1911 | Harris | ............... | A01M 23/08 43/66 |
| 1,146,698 A * | 7/1915 | Franklin | ............... | A01M 23/08 43/66 |
| 1,166,573 A * | 1/1916 | Beverly | ............... | A01M 23/08 43/66 |
| 1,262,160 A * | 4/1918 | Barker | ............... | A01M 23/08 43/66 |
| 1,335,359 A * | 3/1920 | Beisel | ............... | A01M 23/08 43/66 |

(Continued)

*Primary Examiner* — Christopher P Ellis
(74) *Attorney, Agent, or Firm* — Wood Herron & Evans LLP

(57) ABSTRACT

A trap catches multiple iguanas and/or other nuisance animals in one setting. The trap may include a larger confinement volume having a one-way entry door on at least one side and in other embodiments on all sides that remain active no matter how many iguanas are in the trap. The entry door is designed such that once the iguana has started through the door it cannot turn back. Access to remove the iguanas is also provided. A large bait station that can hold several days of bait and be easily rebaited with minimal contact with the trap is also provided. An auxiliary cage may be coupled to the trap to off-load captured iguanas without moving the primary trap.

26 Claims, 22 Drawing Sheets

(56) References Cited

U.S. PATENT DOCUMENTS

| | | | | |
|---|---|---|---|---|
| 1,765,941 A | * | 6/1930 | Sawyer | A01M 23/08 43/66 |
| 1,877,712 A | * | 9/1932 | Zelma | A01M 23/00 43/61 |
| 1,911,919 A | * | 5/1933 | Molls | A01M 23/18 43/66 |
| 2,178,789 A | * | 11/1939 | Heath | A01M 23/08 43/66 |
| 3,393,468 A | * | 7/1968 | Wood | A01M 23/08 43/66 |
| 4,173,092 A | * | 11/1979 | Nakai | A01M 23/18 43/61 |
| 4,214,399 A | * | 7/1980 | Bradley | A01M 23/08 43/66 |
| 5,410,837 A | * | 5/1995 | Kazzyk | A01M 23/08 43/66 |
| 5,979,105 A | * | 11/1999 | Marks | A01M 23/18 43/87 |
| 9,781,910 B1 | * | 10/2017 | Burrell | A01K 69/06 |
| 11,122,793 B2 | | 9/2021 | Portuallo | |
| 2005/0081425 A1 | * | 4/2005 | Guidry | A01M 23/04 43/69 |
| 2006/0254122 A1 | * | 11/2006 | Murchison | A01M 23/08 43/61 |
| 2007/0017148 A1 | * | 1/2007 | Blau | A01M 23/08 43/61 |
| 2008/0256842 A1 | * | 10/2008 | Vasseghi | A01M 23/08 43/65 |
| 2014/0259873 A1 | * | 9/2014 | Zhu | A01M 23/08 43/61 |
| 2015/0033614 A1 | * | 2/2015 | Allbright, Jr. | A01M 23/18 43/60 |
| 2017/0202204 A1 | * | 7/2017 | Baxter | A01M 23/18 |
| 2020/0288696 A1 | * | 9/2020 | Cassens | A01M 23/08 |
| 2022/0046909 A1 | * | 2/2022 | Kletzli | A01M 23/18 |
| 2022/0151218 A1 | * | 5/2022 | Davis | A01M 23/08 |
| 2023/0263151 A1 | * | 8/2023 | Creel | A01M 23/08 43/61 |

* cited by examiner

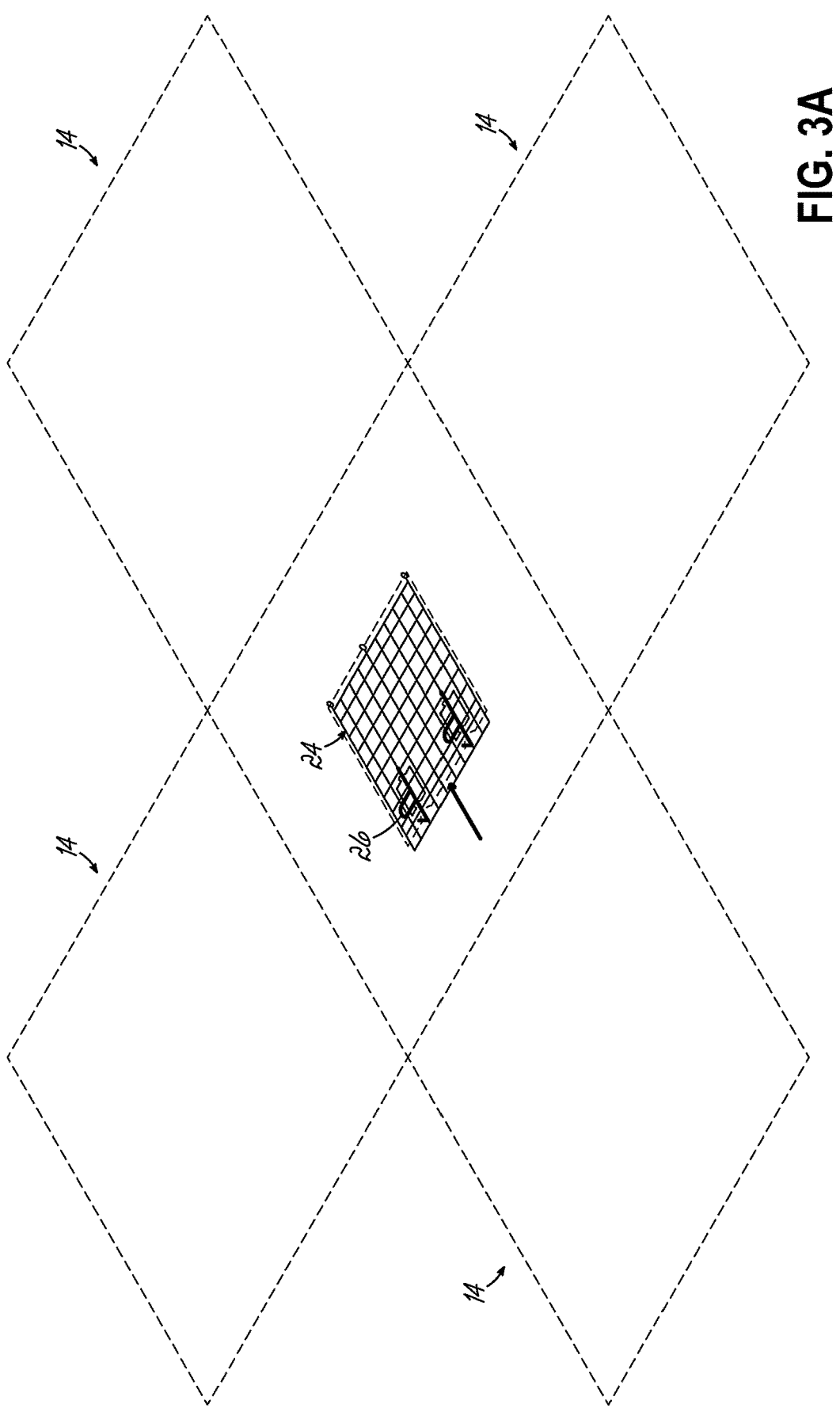

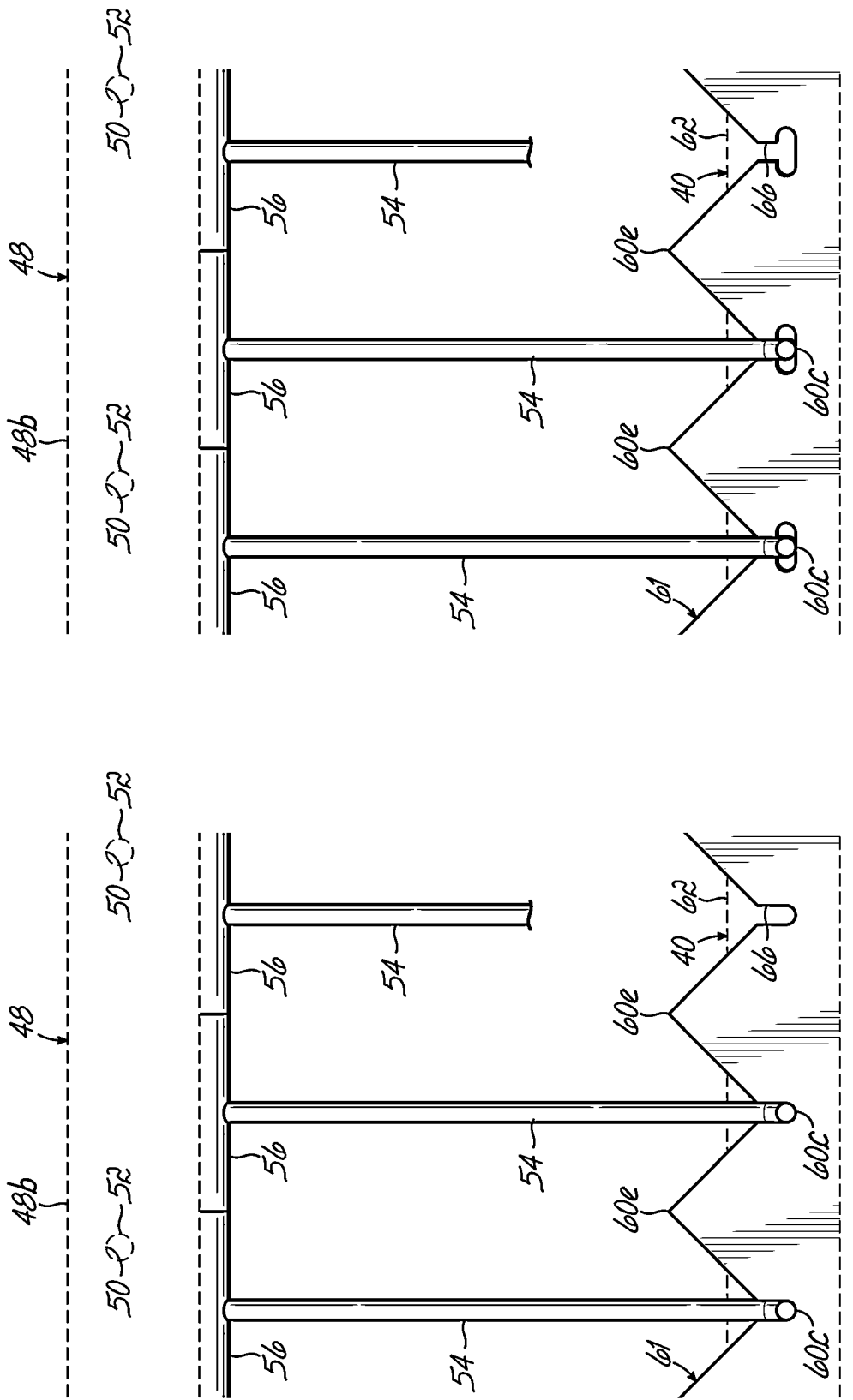

NUISANCE ANIMAL TRAP

This claims the benefit of U.S. Provisional Patent Application Ser. No. 63/332,717, filed Apr. 20, 2022 and hereby incorporated by reference in its entirety.

BACKGROUND OF THE INVENTION

This invention relates generally to animal traps, and more specifically, to an animal trap designed to capture iguanas and other nuisance species.

Iguanas are herbivorous lizards with exceptional vision native to tropical areas of Mexico, Central America, and the Caribbean. They range in size between five (5) and six (6) feet long as mature adults. Most people are familiar with the common green iguana. These pests are non-native to North America and the infestation of iguanas in the United States has caused havoc for residents and native species. South and Central Florida's subtropical climate allows these large herbivorous lizards to survive, reproduce, and become part of the Florida environment.

Iguanas are an invasive species in the southern US. They have no natural predators once they become an adult, so they are multiplying in record numbers. They are causing millions and millions of dollars in property damage annually. The iguanas have now moved in to farming communities and are devastating domestic produce production costing farmers enormous loses.

Adult iguanas are herbivores feeding on foliage, flowers, and fruit. They will occasionally eat animal material such as insects, lizards, and other small animals, nesting birds and eggs. Juveniles eat more animal material, especially insects, and hatchling green iguanas eat the droppings of adult iguanas to acquire the gut bacteria that help them digest plant material. Males are territorial against other males, but are not territorial against females and juveniles. These large lizards like to bask in open areas, sidewalks, docks, seawalls, landscape timbers, or open mowed areas. If frightened, they dive into water or retreat into their burrows. This habit of diving into the water to escape makes green iguanas very difficult to capture.

Iguanas cause damage to residential and commercial landscape vegetation and are often considered a nuisance by property owners. Iguanas are attracted to trees with foliage or flowers, most fruits and almost any vegetable. Some green iguanas cause damage to infrastructure by digging burrows that erode and collapse sidewalks, foundations, seawalls, berms and canal banks. Green iguanas may also leave droppings on docks, moored boats, seawalls, porches, decks, pool platforms and inside swimming pools. Although primarily herbivores, researchers found the remains of tree snails in the stomachs of green iguanas in Florida State Parks, suggesting that iguanas could present a threat to native and endangered species of tree snails. As is the case with other reptiles, green iguanas can also transmit the infectious bacterium *salmonella* to humans through contact with water or surfaces contaminated by their feces.

Additionally, they defecate in common public areas such as pools, parks, playgrounds, and docks, causing health risks as their feces carry *salmonella*. Moreover, the burrows they dig undermine sidewalks, seawalls, and foundations causing structural damage. As vegetarians, the four-footed reptiles eat their way through landscaping. They sunbathe during the day and cozy up in treetops by night. They can lay as many as seventy five (75) eggs in a single burrow each year. Although iguanas are docile, there are many reported incidents where they have harmed pets and individuals. As with any species, they are territorial, the more dominant males will push the less dominant males to surrounding areas, which leads to infestation.

The current method of control consists of 1) shooting them, although not very practical considering the sheer numbers of iguanas, not to mention the safety concerns; 2) snaring them in a net or lasso which is also not practical and very time consuming; 3) trapping, but all the traps currently being used are traps that have been designed for general trapping of any animal or critter and normally will only capture just one iguana at a time. There is nothing on the market today that can be set on a semi-permanent bases to take advantage of social characteristics of the iguanas and that will continue to capture multiple iguanas.

As a top three invasive species, iguanas are exponentially growing in numbers throughout Southern Florida. Managing them is no longer an option. At their current rate of growth and territory expansion, iguanas will only accelerate their destruction of vegetation and crops costing 10's of millions of dollars in damage and they will overtake other populations.

Damage caused by iguanas includes eating valuable landscape plants, shrubs, and trees, eating orchids and many other flowers, eating dooryard fruit like berries, figs, mangos, tomatoes, bananas, lychees, etc. Iguanas do not eat citrus. Burrows that they dig undermine sidewalks, seawalls, and foundations. Burrows of iguanas next to seawalls allow erosion and eventual collapse of those seawalls. Droppings of iguanas litter areas where they bask. This is unsightly, causes odor complaints, and is a possible source of *salmonella* bacteria, a common cause of food poisoning. Adult iguanas are large powerful animals that can bite, cause severe scratch wounds with their extremely sharp claws, and deliver a painful slap with their powerful tail. Iguanas normally avoid people but will defend themselves against pets and people that try to catch them or corner them.

Hence, there is a long pending need to have a system and method of controlling iguanas and other nuisance species.

SUMMARY OF THE INVENTION

A system and method for trapping and containing iguanas and other nuisance species are provided by various embodiments of this invention.

Iguanas are social lizards and tend to eat, forage, and congregate together. Having a trap that can collect multiple iguanas will enhance the ability to control them effectively and economically. This invention is designed to take advantage of the social nature of iguanas and will capture, and continue to capture iguanas in large numbers, and over time greatly reducing their numbers.

This invention is a trap according to various embodiments and is designed to catch multiple iguana's in one setting. The features of the trap in various embodiments include a large box or cage consisting of one-way door(s) or openings on at least 2 sides and in other embodiments all sides that never lock and remain active no matter how many iguanas are in the trap. An entry door is provided and designed such that once the iguana has started through the door it cannot turn back. Access to remove the iguanas is also provided. A large bait station that can hold several days of bait/food and be easily rebaited while minimal contact with the trap is also provided.

The trap in various embodiments may be designed to be easily disassembled for easy transportation and shipping. The trap may have one or more anchor points so it can be securely anchored to prevent the trap from being stolen or blown away in bad weather such as a hurricane. The access door may have a lock to prevent unauthorized access to the trap and its contents. The trap is designed to operate quietly with no slamming doors or other components that would cause noises that would scare the iguanas away.

The trap in various embodiments has a top designed with "trap doors" such that should an iguana walk on top of the trap, it would fall through the trap door and into the trap. The trap in various embodiments is modular so that the "trap door" or second compartment features could be added or removed at any time depending on the current situation. Besides the main bait area, the trap could have a chute or automatic dispenser that would provide enough or portioned bait to last several days. The trap could have one or more pressure plates by the one-way doors that lock the door when stepped on to prevent smarter animals from opening the door, such as raccoons who might try to figure out how to open the door.

The trap may include a second removable auxiliary cage. Once the iguana has realized they can't get to the bait they will start look for a way out. As the iguana searches for a way out, it will come across access to the auxiliary cage. The iguana will pass through a one-way door that will not let it back into main area of the trap. As with the main trap, the door to the auxiliary cage is designed such that once the iguana has started through the door, it cannot turn back. It can only move forward through the opening. The auxiliary cage could have a clear window opposite the entry door giving the iguana the illusion of freedom and encouraging it in to the second compartment. The auxiliary cage may be removable and replaceable with another auxiliary cage. This would allow the trapper to quickly remove all of the trapped iguanas in the auxiliary cage and reinstall an empty auxiliary cage without disturbing the main trap. The more the trapper is around the trap, the greater the possibility there is of leaving human scent around the trap which would deter the iguanas from coming.

The auxiliary cage may have alignment pins to make sure the transfer opening is properly aligned, and that the iguanas can't escape. Alternatively, the trap may have a transfer chute for alignment with the auxiliary cage. The auxiliary cage may have a way to secure the opening so that the iguanas can't escape during transportation. There may also be a way to secure the opening on the main trap between it and the auxiliary cage to prevent iguanas from escaping during removal. The auxiliary cage may have built in handles for easy transportation and the handles should be protected from animals reaching through and harming humans. The auxiliary cage may have stacking lugs to align the traps for safe stacking during transportation. The trap may be ergonomically and aesthetically designed so not to be intrusive or unsightly. This way it can be placed in communities and neighborhood without offending anyone.

Another invasive species to the US that is destroying environment and wildlife in south and central Florida is the python. As it turns out, iguanas are part of the python's diet. A trap full of iguanas will attract pythons. The design of the trap according to various embodiments of this invention will allow a python to enter in the same fashion as the iguana without restriction. Once a python enters the trap, it will be in the same predicament as the iguanas with no way out. Pythons have now started to move out of the everglades in search of food, such as dogs, cats, rats, racoons, and iguanas. This invention could have a cover made from canvas or like kind material to be used as camouflage and to conceal/hide the trap from view. In winter months it would hold heat in the trap further attracting the iguanas in search of warm places when it gets colder outside. The cover can be in a variety of colors or color combinations to best suit the situation/environment.

Various features and benefits of this invention may include: the capture of up to 100 iguanas at a time depending on their size; the capture of iguanas from 12-18 months old and older; the capture of juvenile iguanas well before they're ready to reproduce; quiet operation so as not to scare other iguanas; meets all "humane trapping standards"; large bait compartment for up to a weeks' worth of bait; commercial construction for years of performance; powder coated or vinyl coating in hunter green for corrosion protection and appearance; modular design for replacement parts; designed for either temporary or semi-permanent installations for 24/365 operation. An optional auxiliary chamber allows for quick in and out when picking up captured iguanas as well as transportation of the iguanas with limited handling thereby maintaining the main trap in continuous operation. No euthanasia of the iguana in public view is required. The trap may be easily disassembled and reassembled for transportation and relocation. Locking ground anchors secure the trap. The trap can be left unattended for up to a week while it continually collects iguanas. Iguanas can live 4 weeks or longer without food depending on body fat. Camouflage netting helps to conceal the trap when necessary. The iguanas become python bait.

BRIEF DESCRIPTION OF THE DRAWINGS

The above-mentioned and other features and advantages of this invention, and the manner of attaining them, will become more apparent and the invention itself will be better understood by reference to the following description of embodiments of the invention taken in conjunction with the accompanying drawings. Like reference numerals are used to indicate like parts throughout the various drawing figures, wherein:

FIG. 3A is a view similar to FIG. 3 with only an access door on the top wall shown;

FIGS. 9A-9F are alternative embodiments of the tines of the entry door according to various embodiments of this invention;

DETAILED DESCRIPTION OF THE INVENTION

Figure 1:
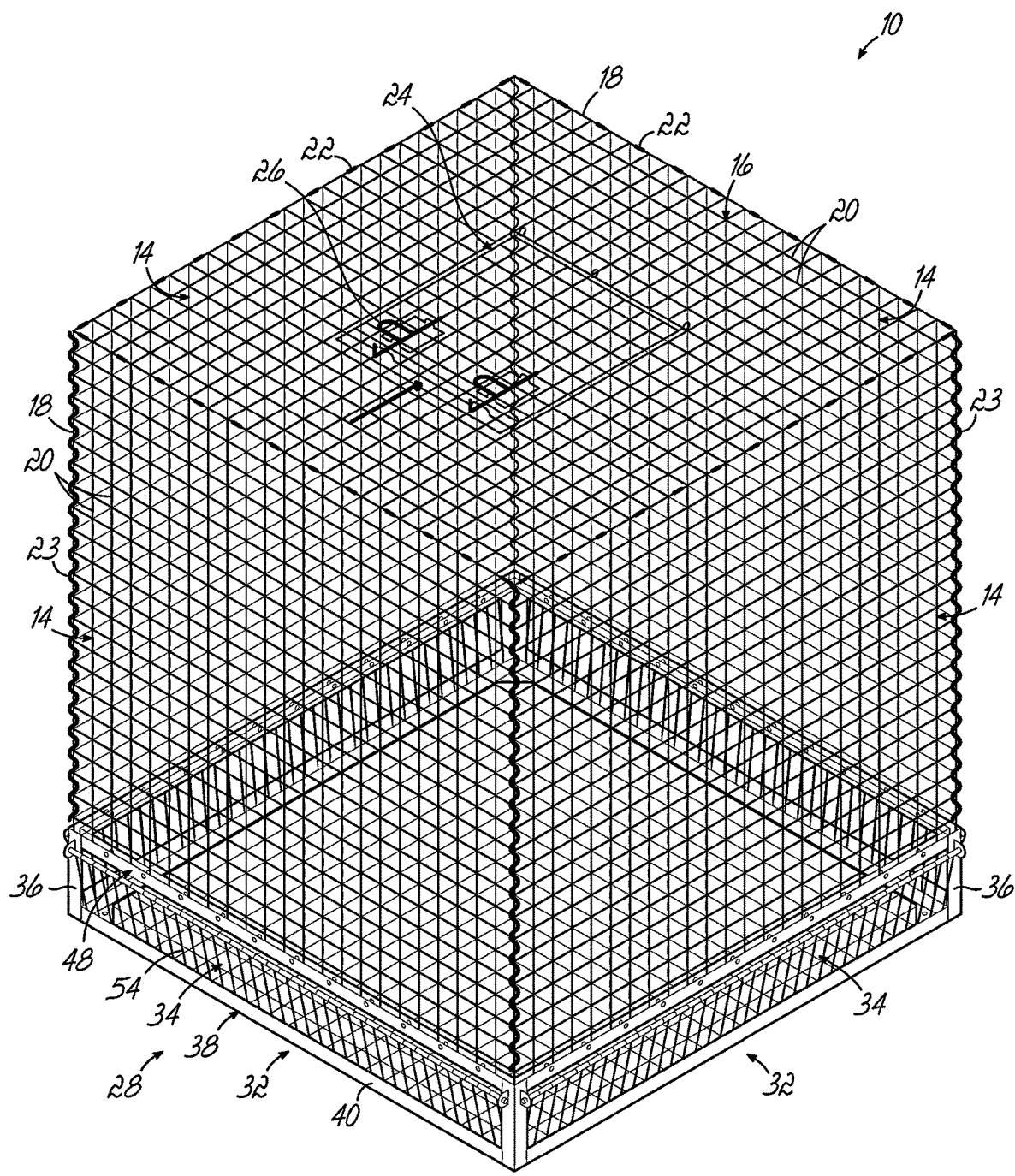
FIG. 1 is a perspective view of one embodiment of the trap according to this invention.

With reference to the drawings, one embodiment of trap 10 according to this invention is shown in FIG. 1. The trap 10 is described herein for use to trap iguanas, but one of ordinary skill in the art will appreciate that this invention is not limited to use for iguanas only, but is readily applicable for trapping any animal or animals 12. According to the embodiment shown in FIG. 1, the trap 10 has four side walls 14 and a top wall 16, but the trap 10 may be in other configurations according to this invention. Each wall 14, 16 may be constructed of a wire mesh 18 formed of a number of intersecting wires 20. The walls 14, 16 may be of another construction according to this invention.

Figure 3:
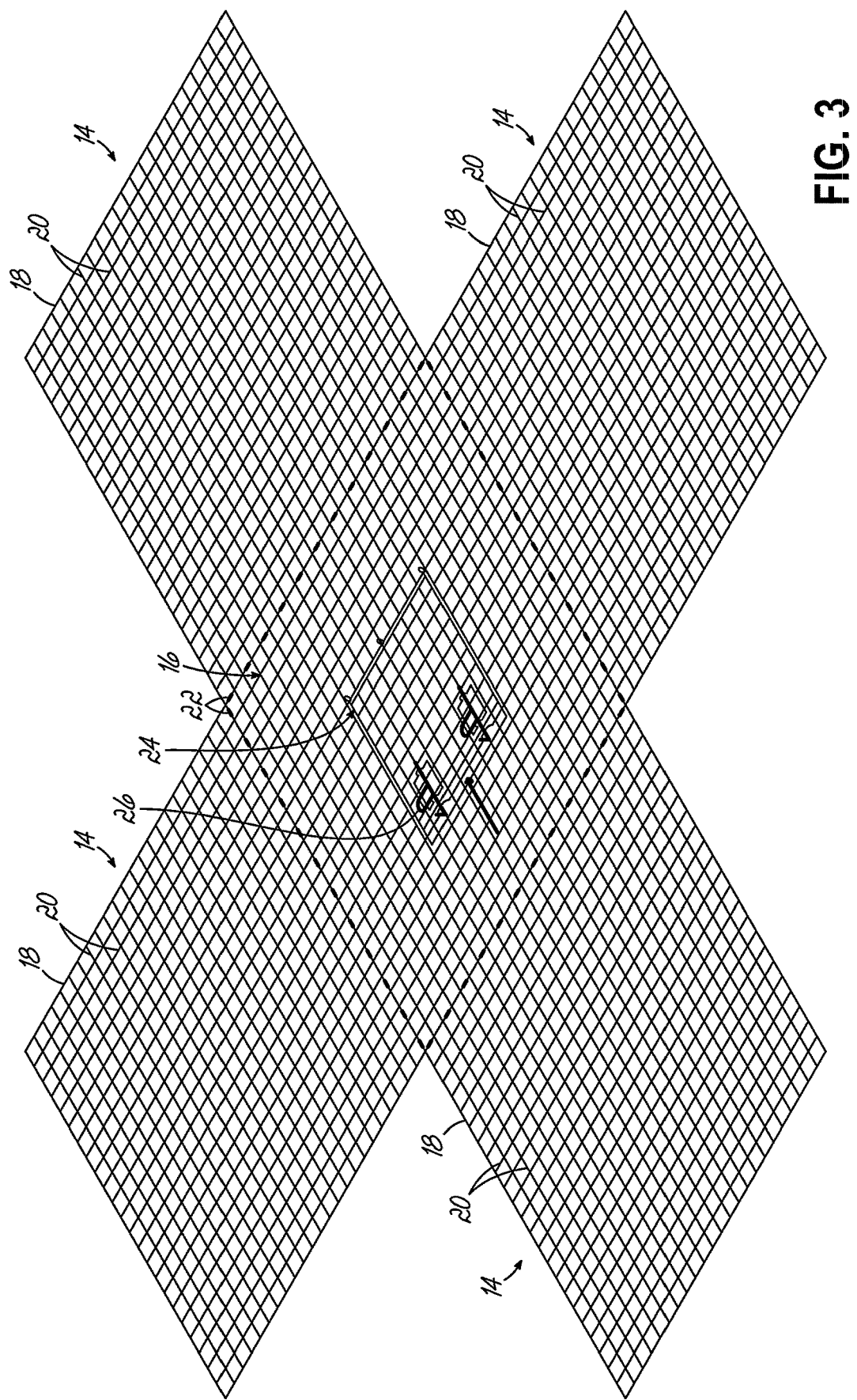
FIG. 3 is a perspective view of the side and top walls of the trap of FIG. 1 in a generally planar configuration.
Figure 4:
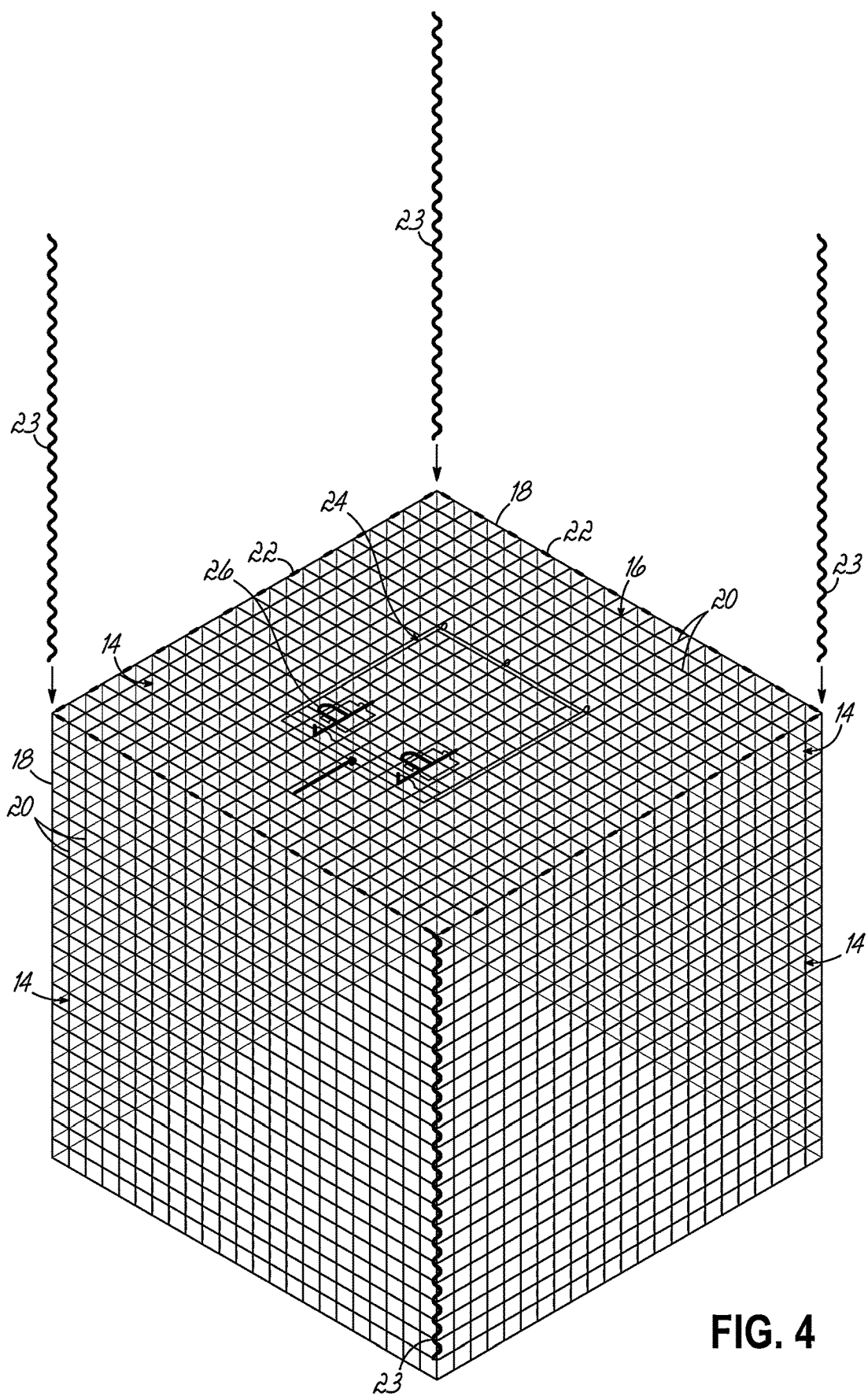
FIG. 4 is a perspective view of the top and side walls being assembled into an erected configuration.

As shown in FIG. 3, each side wall 14, may be pivotally joined to the top wall 16 by a number of clips 22 which join a perimeter edge of each side wall 14 to one of the perimeter edges of the top wall 16 to form a cruciform arrangement. Each side wall 14 may be pivoted downwardly about the associated clips 22 to be generally perpendicular to the top wall 16 and the adjacent side walls 14 as shown in FIG. 4. The adjacent edges of the adjacent side walls 14 may be joined together by twisting, turning, screwing or threading a multi-turn, convolute elongate wire 23 around the perimeter wires of each of the adjacent side walls 14. The top wall 16 is shown with an access door 24 pivotally mounted to the top wall 16 and secured in a closed position by a clasp 26. In alternative embodiments, the trap 10 may be manufactured in one piece with all of the side walls permanently affixed to each other as well as a base 28.

Figure 2:
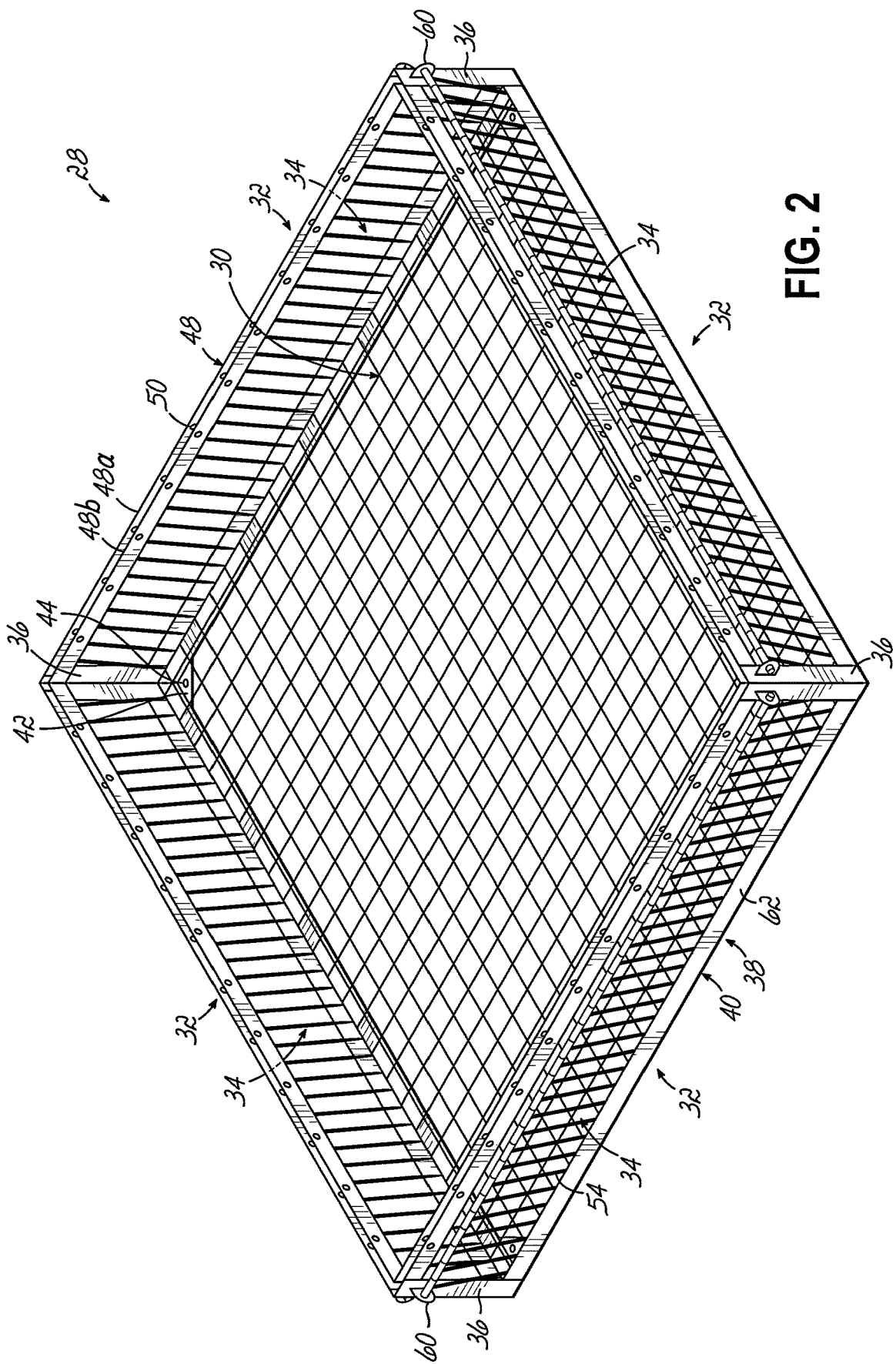
FIG. 2 is a perspective view of the base of the trap of FIG. 1.

The trap 10 according to various embodiments includes a base 28 as shown in FIG. 2. The base 28 is assembled with the side and top walls 14, 16 to form the trap 10. The base 28 includes a bottom panel or wall 30 which may be mesh or of another configuration. A number of walls 32 extend upwardly from the bottom panel 30 equal in number to the number of side walls 14 on the trap 10. In the embodiment shown in FIGS. 1-2, each wall 32 of the base 28 includes an entry door 34 for the iguana 12 to enter the trap 10. Each entry door 34 may extend substantially the full length of the associated wall 32 as shown in FIG. 2.

Figure 5:
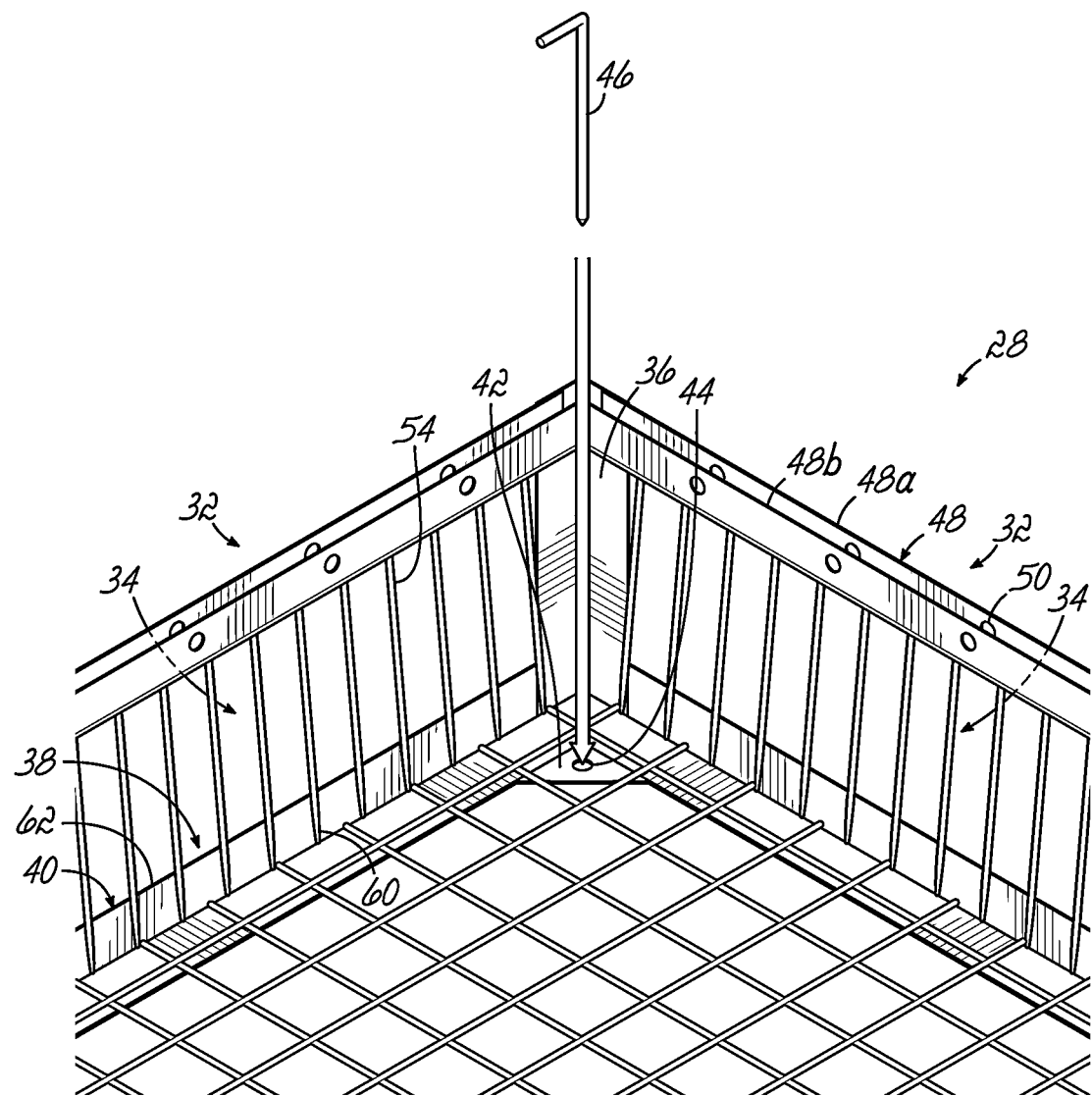
FIG. 5 is an enlarged perspective view of a corner of the base of the trap being secured to an underlying ground surface.
Figure 6:
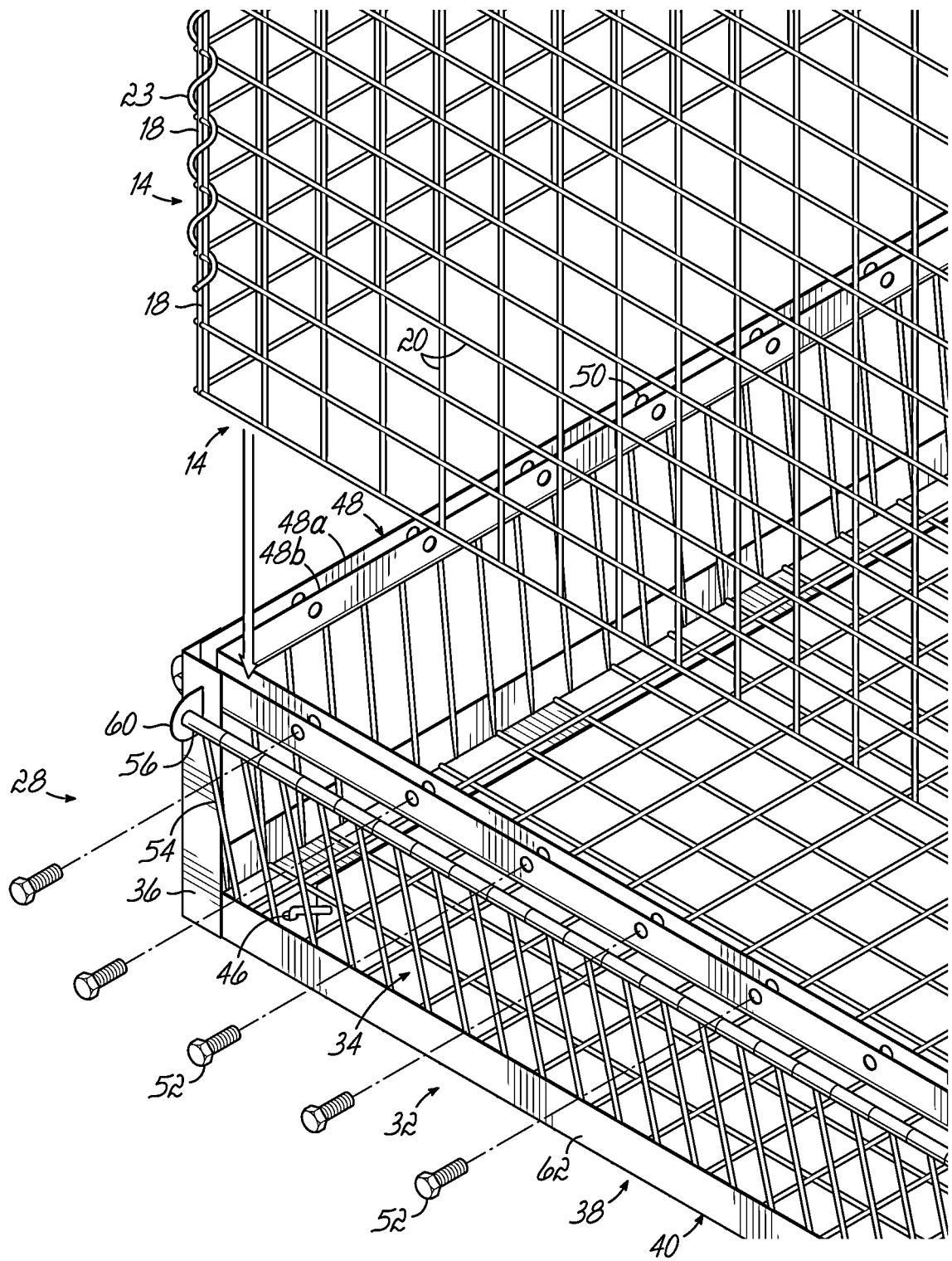
FIG. 6 is an enlarged perspective view of a portion of the erected side walls being coupled to the base.

As shown most clearly in FIGS. 2 and 5-6, the base 28 includes corner posts 36 at each juncture between adjacent walls 32. A base frame 38 is formed around the bottom perimeter of the base 28 and each frame member 40 of the base frame 38 may be L-shaped in cross-section. A gusset 42 at each corner of the base frame 38 may have an aperture 44 through which a stake 46 or other anchor post may be inserted to at least temporarily secure the trap 10 to the ground surface there beneath. An upper rim 48 of each wall 32 may have a spaced double-wall 48a, 48b construction as shown in FIGS. 5-6. Each rim wall 48a, 48b of the upper rim 48 may have a number of holes 50 therein aligned with a complimentary hole 50 in the adjacent rim wall 48a, 48b.

As seen in FIG. 6, a lower edge of each side wall 14 may be seated on the upper rim 48 between the rim walls 48a, 48b to mate the base 28 with the side walls 14 and top wall 16 of the trap 10. Mechanical fasteners, screws or bolts 52 may be inserted into the aligned holes 50 to secure the side walls 14 to the base 28.

Each entry door 34 may have a number of spaced and downwardly oriented tines 54 suspended from a hub 56 mounted on a rod 58. Each rod 58 is mounted between a pair of end brackets 60 and spaced from the upper rim 48 of the associated base wall 32. Each tine 54 is mounted via its associated hub 56 for pivotal movement about the rod 58. As shown in FIG. 5, each tine 54 has a spike 60 or other end feature at a distal end of the tine 54. The spike or end feature 60 of each tine 54 is juxtaposed to an inner surface of an upstanding leg or detent 62 of the frame member 40 of the base frame 38 such that the tine 54 may only pivot inwardly into an interior of the trap 10. Each tine 54 of each entry door 34 is prevented by the upstanding leg 62 of the frame member 40 from pivoting outwardly beyond the upstanding leg 62. Each tine 54 is biased by gravity to rest against the associated upstanding leg 62 since the rod 58 is positioned outwardly from the upstanding leg 62 as shown in FIGS. 6, 7, 8A and 8C. Alternative embodiments of the trap 10 may include one or more torsion springs biasing the tines 54 outwardly against the upstanding leg 62.

Figure 7:
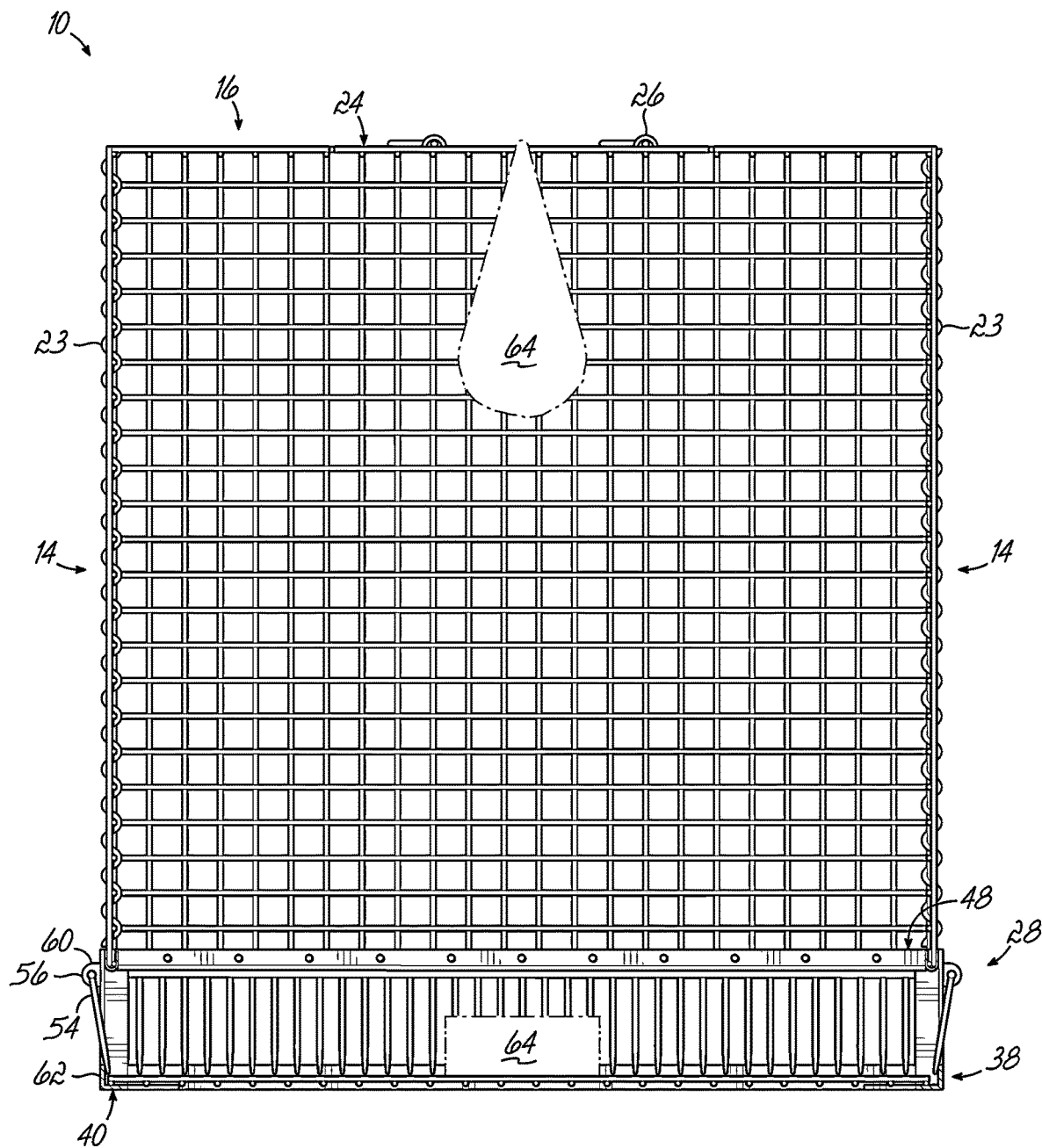
FIG. 7 is a side elevational view of the assembled trap according to one embodiment of this invention with bait receptacles shown in phantom lines.
Figure 8A:
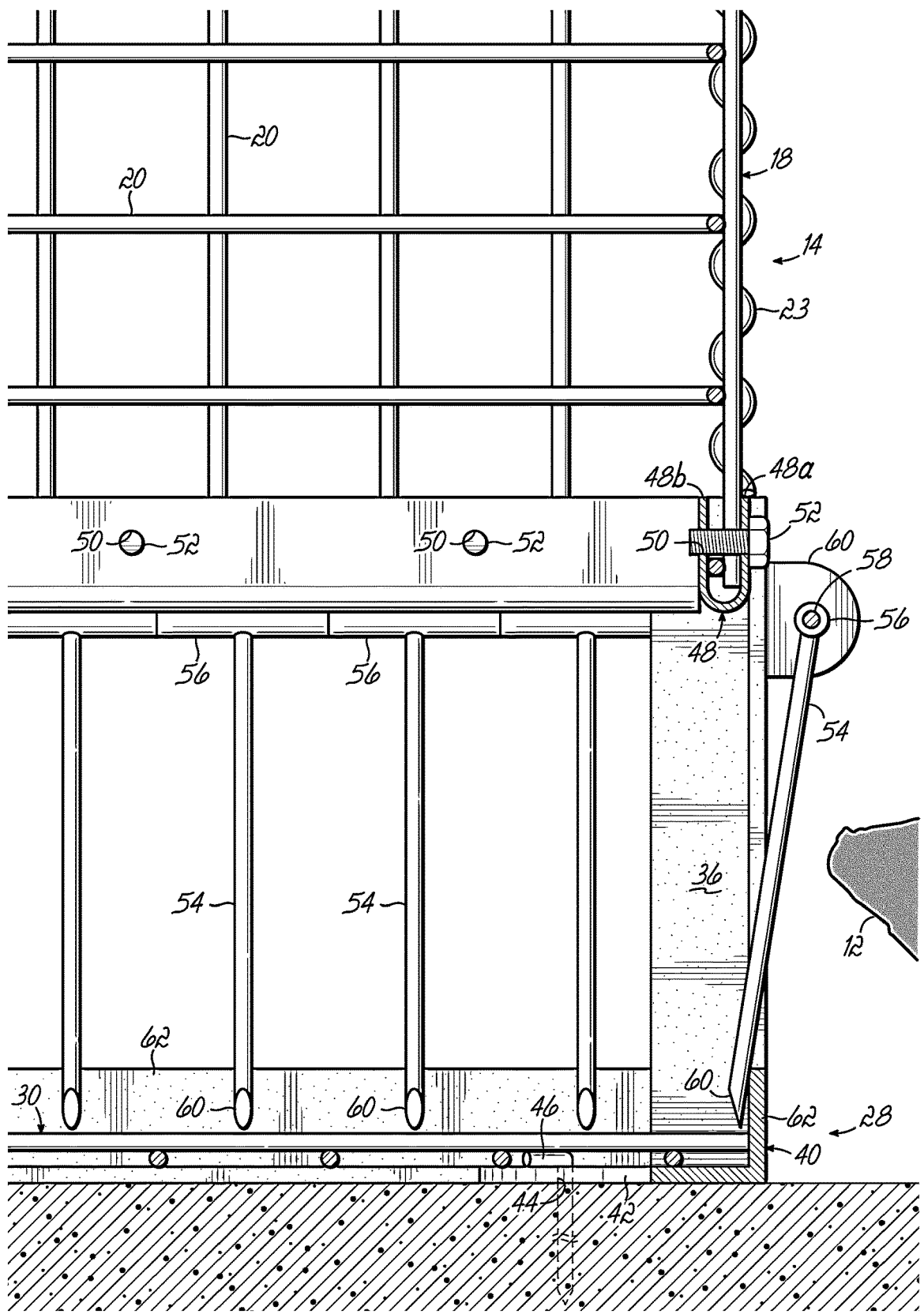
FIG. 8A is an enlarged side elevational view partially in cross-section showing an iguana approaching tines of an entry door on the base of the trap.
Figure 8B:
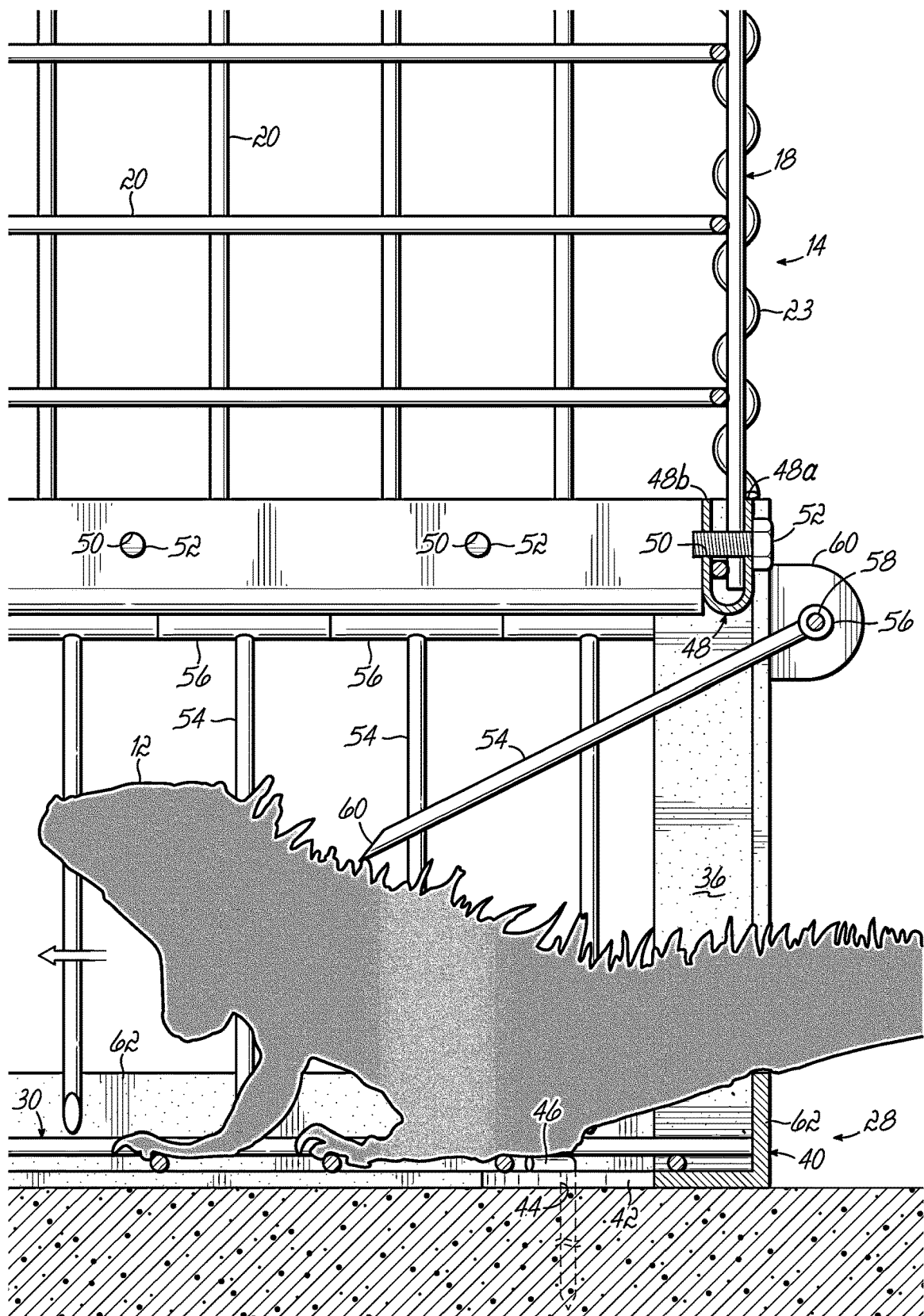
FIG. 8B is a view similar to FIG. 8A with the iguana entering the entry door and deflecting the tines inwardly.
Figure 8C:
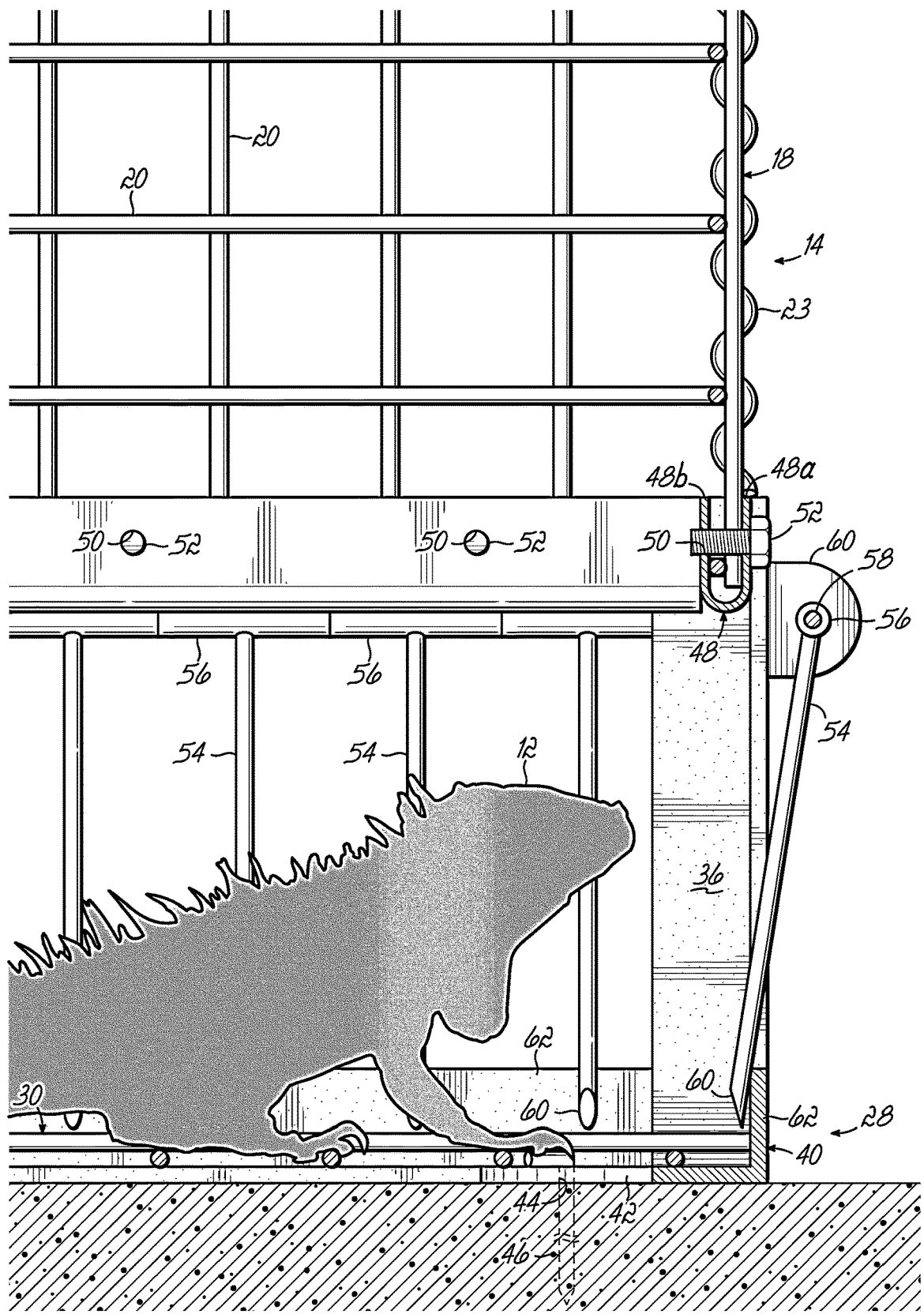
FIG. 8C is a view similar to FIGS. 8A and 8B with the iguana trapped in the trap.

As seen in FIG. 7, one or more bait receptacles 64 may be suspended from the top wall 16 and/or located on the bottom wall 30 to entice the iguana 12 to enter the trap 10 via one of the entry doors 34. Referring to FIGS. 8A thru 8C, the iguana 12 may approach one of the entry doors 34 in search of the bait 64 within the trap 10 (FIG. 8A). The iguana 12 pushes through one or more tines 54 of the entry door 34 thereby pivoting the associated tines 54 inwardly about the rod 58 from which the tines 54 are suspended. The tines 54 offer little resistance to the iguana 12 entering the trap 10 in search of the bait 64 (FIG. 8B). Once the iguana 12 has entered the trap 10, each inwardly pivoted tine 54 which allowed entry of the iguana 12 returns to its rest position by gravity or otherwise against the upstanding leg 62 of the frame member 40 as shown in FIG. 8C. The iguana 12 is prevented from escaping the trap 10 by pushing the tines 54 of the entry doors 34 outwardly because the tines 54 are prevented from pivoting outwardly beyond the upstanding leg 62 of the frame member 40. The spacing between the tines 54 is sufficiently small to prevent a trapped iguana 12 or other animal from escaping the trap 10 between the tines 54. The hub 56 of each tine 54 is juxtaposed against the adjacent hub 56 of the adjacent tine 54 to prevent lateral movement of the tines 54. Moreover, other iguanas 12 may also enter the trap 10 via the entry doors 34 in a similar manner even though one or more iguanas are already trapped in the trap 10. —Each "Tine" swings independently so as the iguana enters the trap the tines slide/hug along its body, so as they enter the trap they don't create an opening large enough for an iguana that is already in the trap to escape.

In various embodiments of this invention, the tines 54 are constructed to allow non-target animals to escape (racoons, opossums, cats, etc.). Iguanas front legs are uniquely different from other animals. Non-target animals may have front paws with much greater dexterity for holding food or other smaller tasks. The iguanas have large spread out toes more conducive to climbing than for finer dexterity. This unique difference allows non-target animals to grab the tines in ways the iguana cannot. Non-target animals may simply grab the tine and pull it up to create an exit. Pythons and other snakes, for example, have no hands, but like iguanas they push their way into the trap and remain captured as they have no way to open the tines.

Figure 9B:
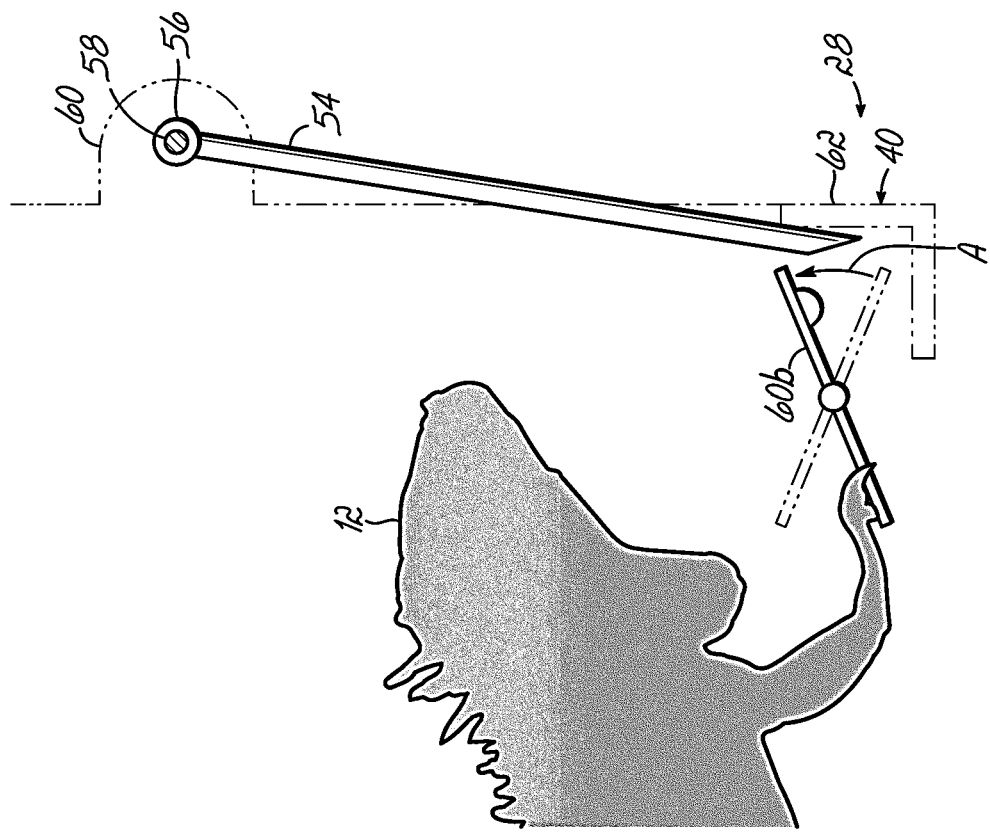
Figure 9A:
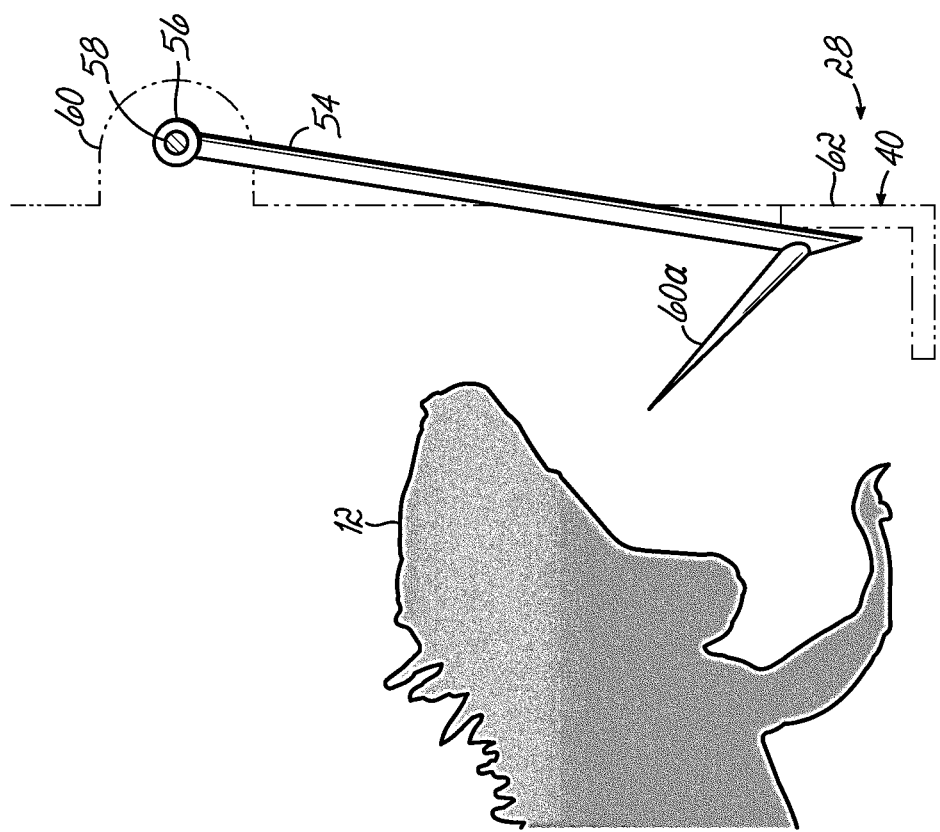
Figure 9D:
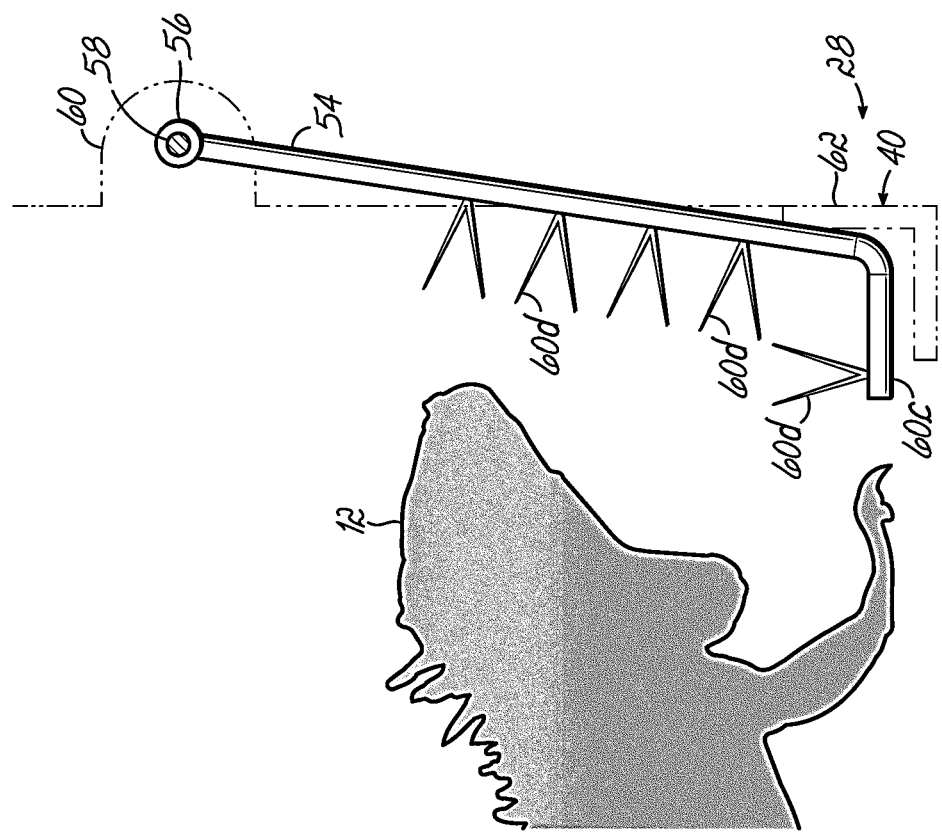
Figure 9C:
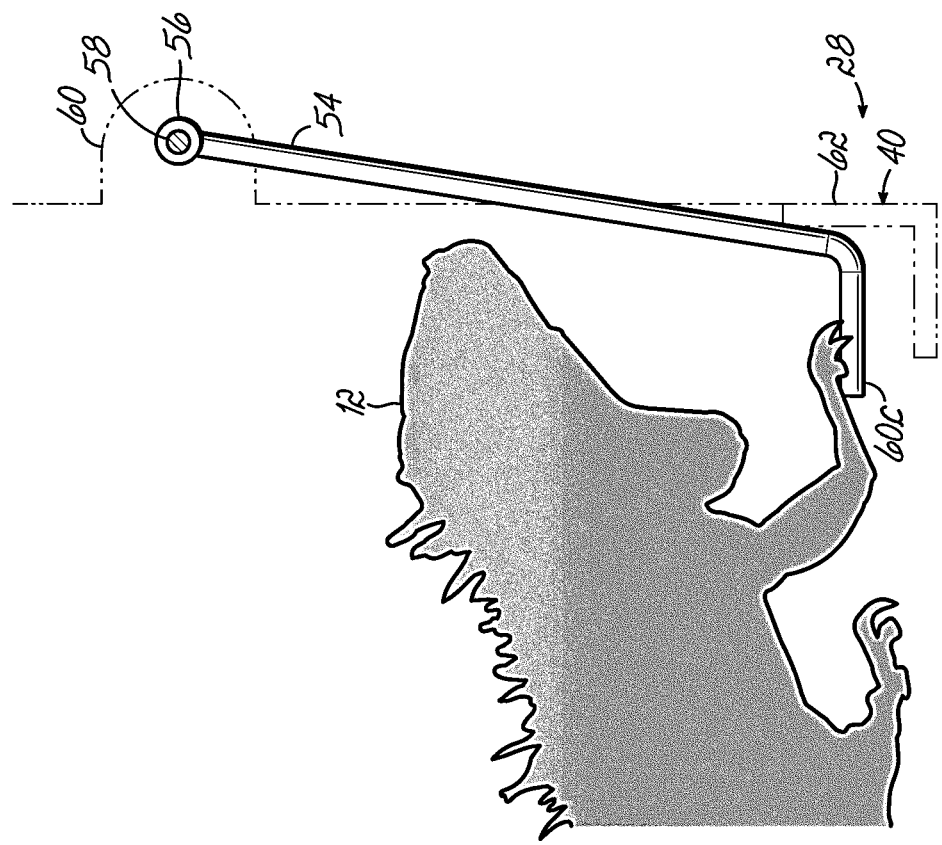

Alternative embodiments of the entry door 34 and/or end feature 60 are shown in FIGS. 9A thru 9F according to this invention. Each tine 54 may have an additional spike 60a projecting into the interior of the trap 10 as shown in FIG. 9A to deter a trapped iguana 12 from exiting the trap 10. A pivot plate 60b as in FIG. 9B may be positioned relative to one or more tines 54 to block the associated tine(s) 54 from pivoting inwardly when stepped on by the iguana 12 trapped in the trap 10. An end of the pivot plate 60b pivots upwardly in the direction of arrow A to block inwardly movement of the associated tine(s) 54. The end feature 60c of the tine 54 may be an inwardly directed flange 60c such that when the trapped iguana 12 steps on the flange 60c, the tine 54 is forced against the upstanding leg 62 to prevent the iguana 12 from exiting through the entry door 34. The end feature 60d may be one or more spikes 60d projecting from the flange 60c and/or a shaft of the tine 54.

A barricade 61 may be added to the L-shaped frame member and spaced from the upstanding leg 62 as shown in FIGS. 9E-9F. The barricade 61 may have one or more peaks 60e formed therein with a groove 66 between each peak 60e. The groove 66 may be laterally oriented as shown in FIG. 9F to allow for lateral movement of the tine 54 seated in the groove 66.

Figure 10:
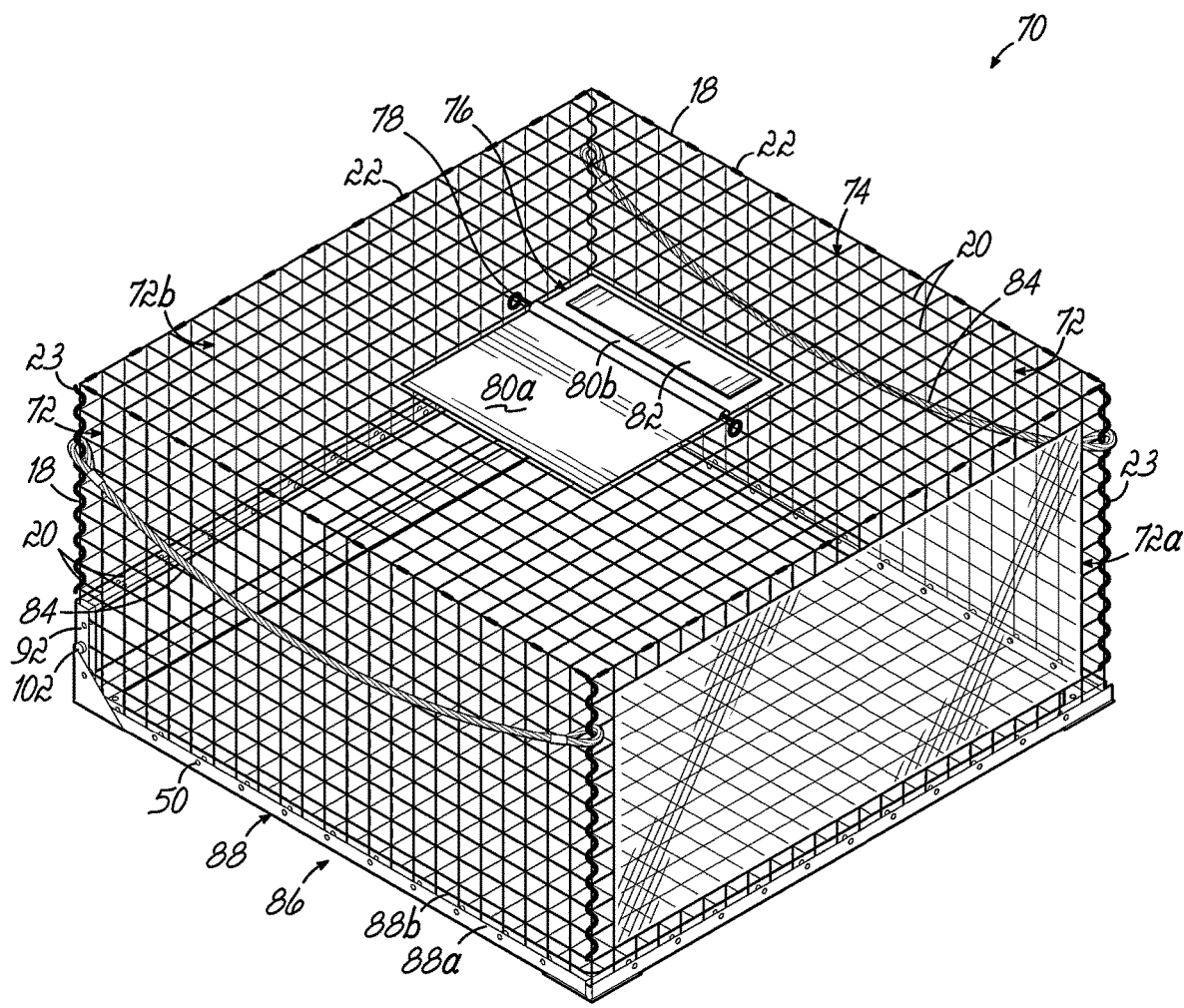
FIG. 10 is a perspective view of an auxiliary cage according to various embodiments of this invention.
Figure 10A:
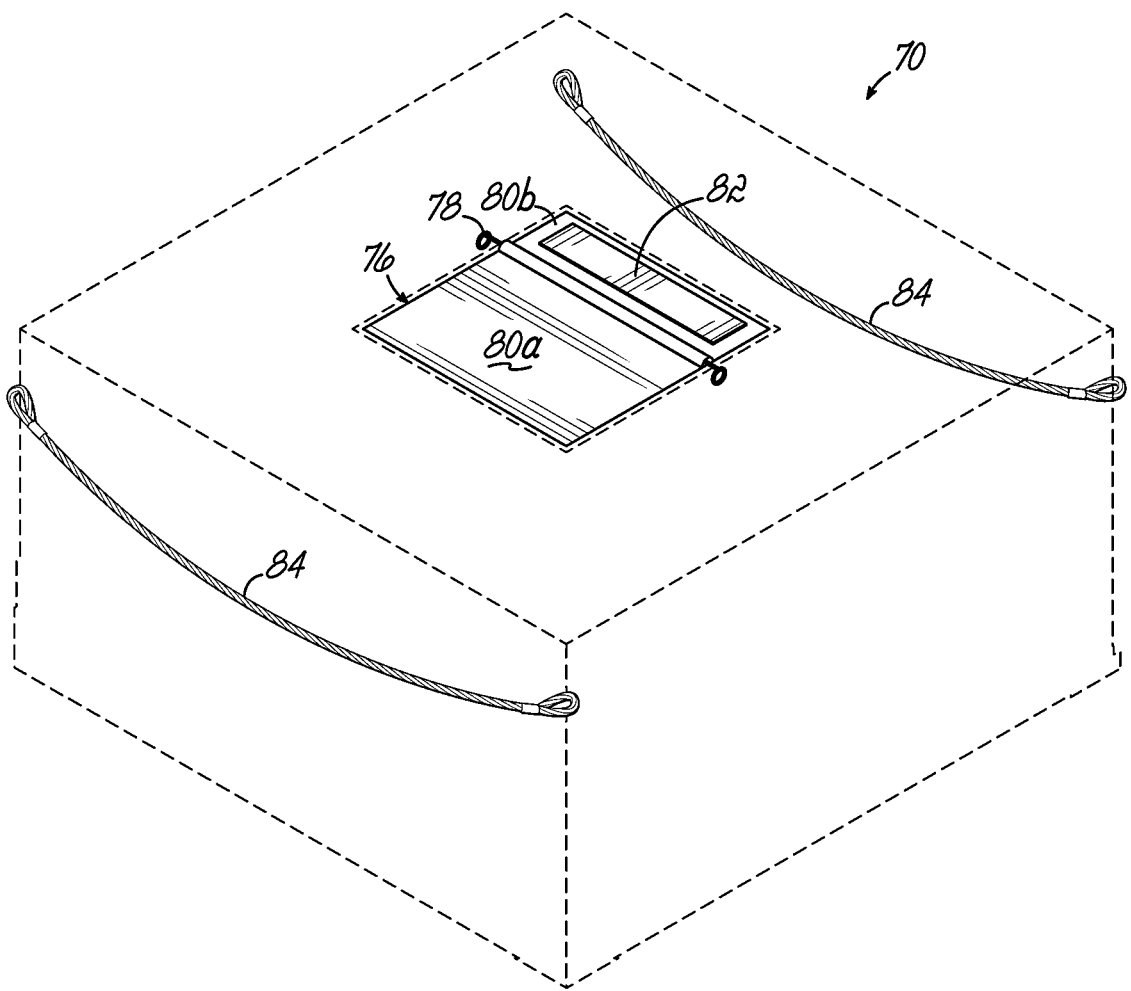
FIG. 10A is a view similar to FIG. 10 showing handles and a trap door on the auxiliary cage.

Another aspect of various embodiments of this invention is shown in FIGS. 10-10A in the form of an auxiliary cage 70 which may have four side walls 72 and a top wall 74. Upper edges of the side walls 72 may be joined to perimeter edges of the top wall 74 with clips 22 as in the trap 10. One or more of the side walls 72 may include a mirror 72a to provide a reflection of any iguana 12 within the cage 70 or trap 10. The side wall 72b opposite from the mirror 72 may be shorter than the other side walls 72. Adjacent side edges of the side walls 72 may be joined to each other with convolute wires 23 as in the trap 10. The top wall 74 may have a trap door 76 which is mounted on a pivot shaft 78 to divide a trap door wall 80 into major and minor portions 80a, 80b. The minor portion 80b may have a weight 82 to bias the trap door wall 80 into a closed position about the pivot shaft 78. When an iguana 12 or other animal steps on the major portion 80a of the trap door wall 80, the mass of the iguana 12 or other animal overcomes the mass of the weight 82 and the trap door wall 80 pivots about the pivot shaft 78 with the major portion 80a pivoting downwardly and the iguana 12 falling into the auxiliary cage 70. Once the mass of the iguana 12 is removed from the major portion 80a of the trap door wall 80, the weight 82 pivots the minor portion 80b downwardly to the closed position shown in FIGS. 10-11. The trap door 76 may be included in the auxiliary cage 70, the trap 10 or both of them in various embodiments of this invention.

Figure 11:
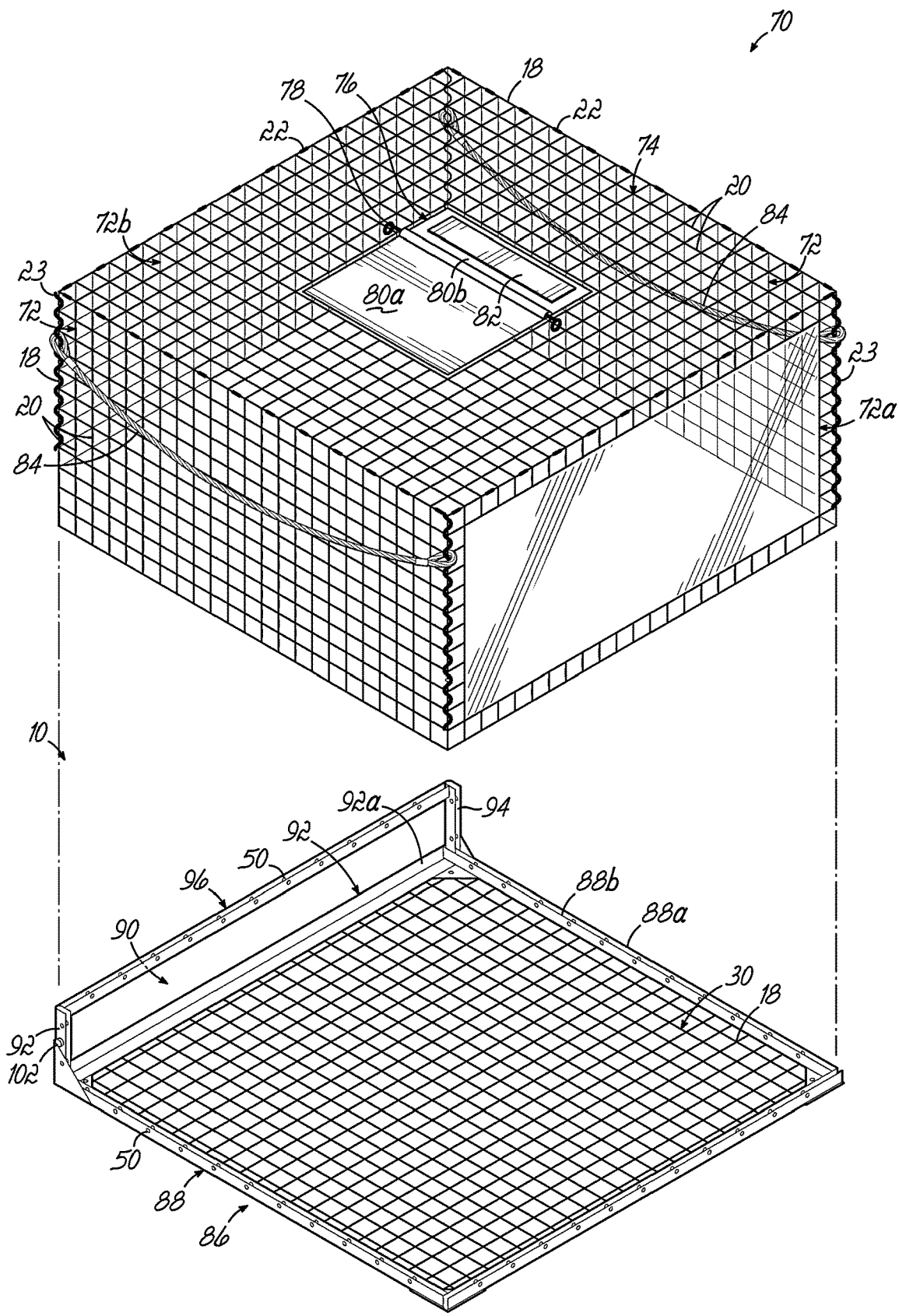
FIG. 11 is a perspective view of the erected side and top walls being assembled with a base of the auxiliary cage.

The auxiliary cage 70 is easily transported by a user grasping one or both cable handles 84 attached to the side walls 72 and/or top walls 74. The cable handles 84 are located on the exterior of the auxiliary cage 70 so that any iguana or other animal 12 within the cage 70 may not damage, weaken or interfere with the cable handles 84. The auxiliary cage 70 includes a base 86 having a wire mesh 18 and a perimeter frame 88. Three sides of the perimeter frame 88 include spaced double-wall 88a, 88b construction as shown in FIG. 11. Each rim wall 88a, 88b of the frame 88 may have a number of holes 50 therein aligned with a complimentary hole 50 in the adjacent frame wall 88a, 88b. As seen in FIG. 11, a lower edge of each side wall 72 may be seated on the frame 88 between the walls 88a, 88b to mate the base 86 with the side walls 72 and top wall 74 of the auxiliary cage 70. Mechanical fasteners, screws or bolts 52 may be inserted into the aligned holes 50 to secure the side walls 72 to the base 86.

One side of the base frame 88 may have an entry portal 90. The entry portal 90 is formed by an L-shaped member 92 on the fourth side of the frame 88 having an upstanding leg 92a. Side posts 94 extend upwardly from the frame 88 and a U-shaped upper member 96 extends between the posts 94 and spaced above the L-shaped member 92. Each side post 94 also has a U-shaped cross-section. The spaced walls of the U-shaped members 94, 96 may have a number of holes 50 therein aligned with a complimentary hole 50 in the adjacent member. As seen in FIG. 11, a lower edge of the shorter side wall 72b may be seated on the upper member 96 between the spaced walls to mate the base 86 with the side walls 72 and top wall 74 of the auxiliary cage 70. The lower ends of the side edges of the walls 72 adjacent to the shorter wall 72b may be seated between the walls of the U-shaped side posts 94. Mechanical fasteners, screws or bolts 52 may be inserted into the aligned holes 50 to secure the side walls 72 to the base 86. The posts 94, L-shaped frame member 92 and the upper member 96 define the entry portal 90 of the auxiliary cage 70.

Figure 12A:
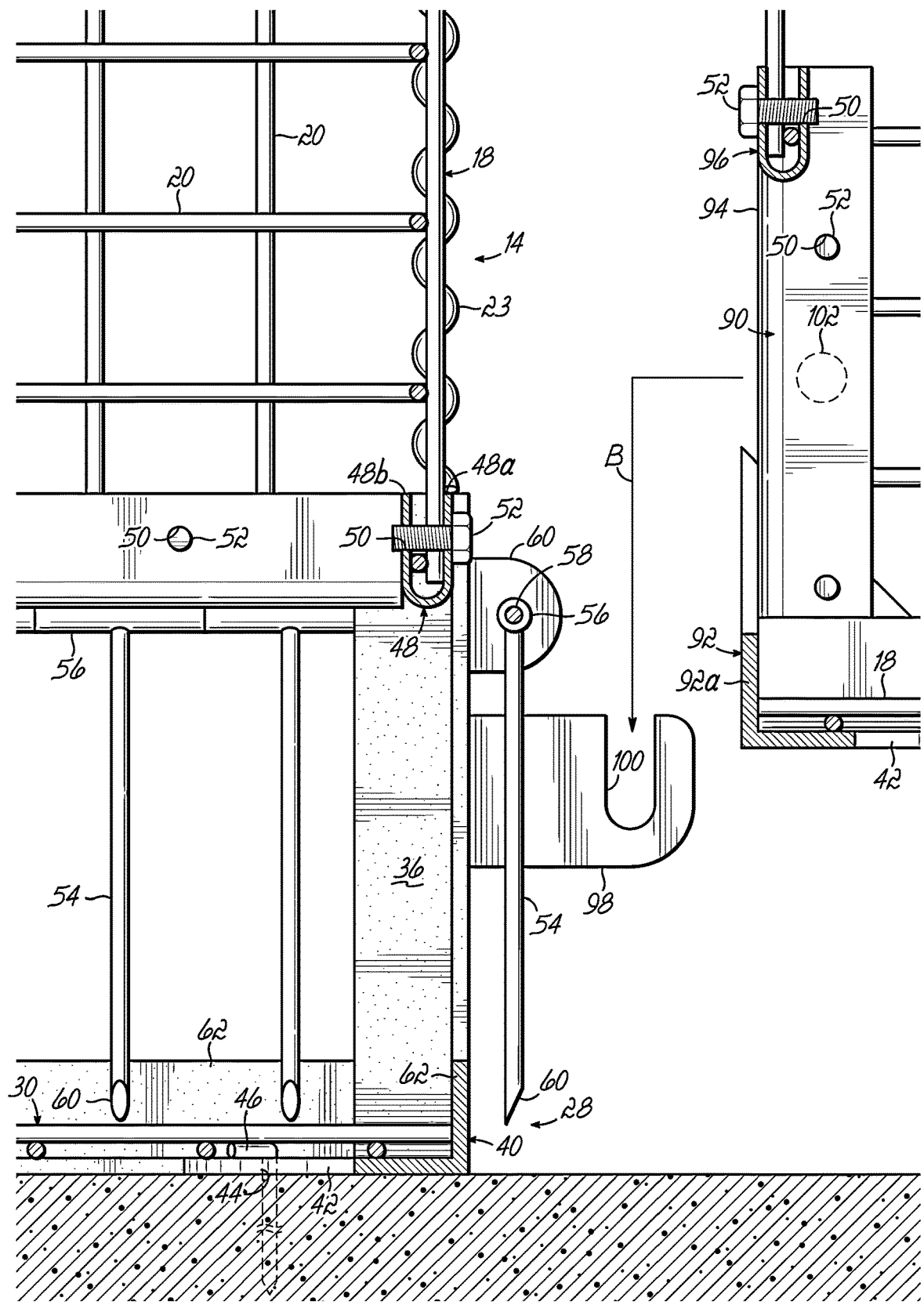
FIGS. 12A and 12B are sequential side elevational views partially in cross-section of the auxiliary cage being coupled to the trap according to one embodiment of this invention.
Figure 12B:
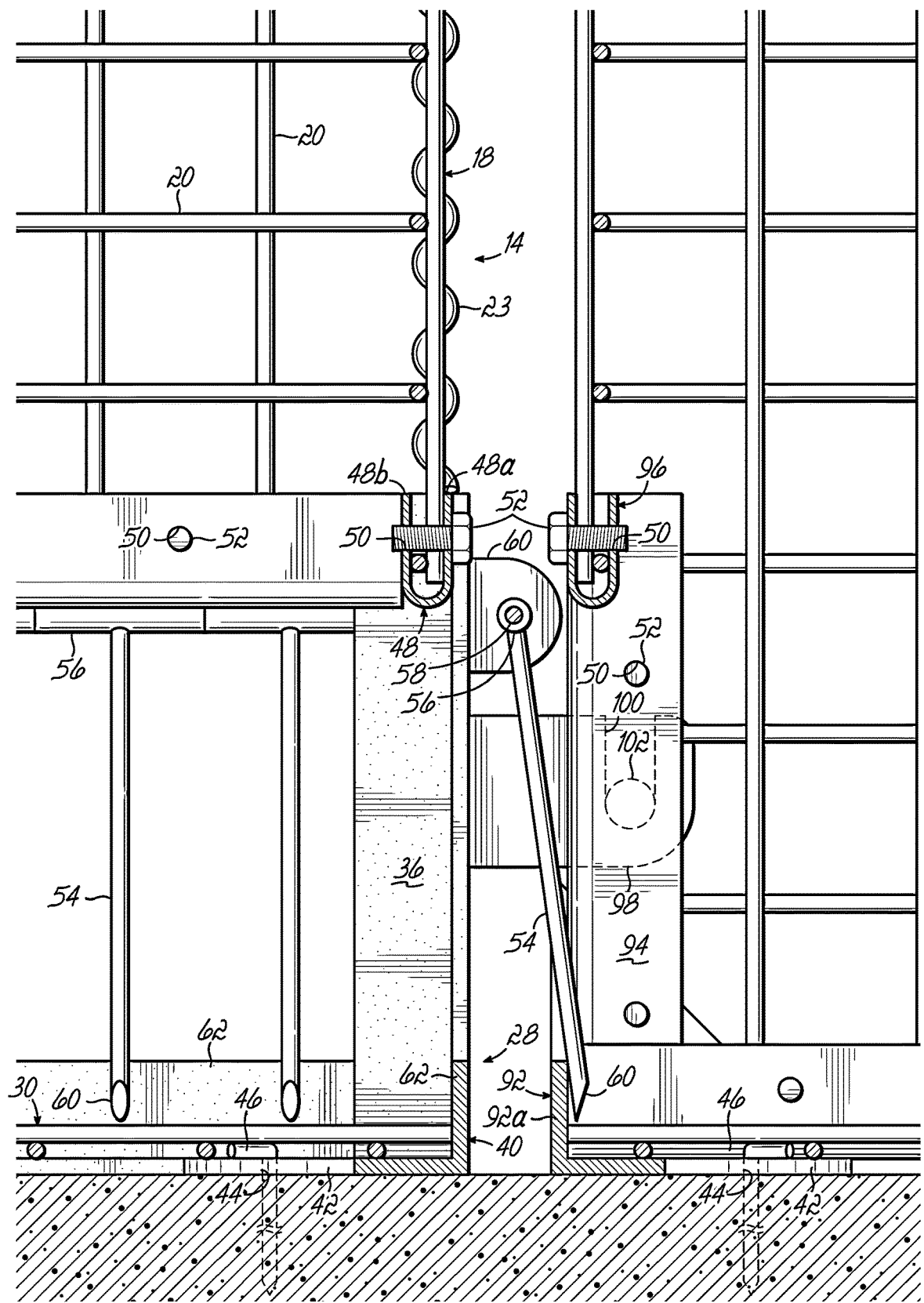

When the trap 10 has one or more iguanas 12 captured therein, the auxiliary cage 70 may be coupled to the trap 10 of off-load the iguanas 12 into the cage 70. One or more brackets 98 with an upward U-shaped slot 100 may extend from a common side of the trap 10 as shown in FIG. 12A. The tines 54 of the entry door 34 on the side of the trap 10 with the brackets 98 may be positioned outwardly of the upstanding leg 62 and hang generally vertical from the rod 58. A brace 102 is provided on the posts 94 extending between the walls of the post 94. The cage 70 is coupled to the trap 10 by lowering the cage 70 and positioning the brace 102 to be seated in the U-slot 100 of the bracket 98 as shown by arrow B in FIG. 12A. Alternative embodiments of this invention may have the bracket on the auxiliary cage and the brace on the trap or another attachment system. The tines 54 of the entry door 34 adjacent to the cage 70 and the entry portal 90 are positioned against the upstanding leg 92a of the L-shaped frame member 92 as shown in FIG. 12B. In this arrangement, the cage 70 is coupled to the trap 10 and the entry door 34 is in communication with the entry portal 90 to allow iguanas 12 in the trap 10 to pass through the entry portal 90 and into the cage 70. The mirror 72a is visible by the iguanas 12 in the trap 10 and the reflections seen in the mirror 72a entice the iguanas 12 to pass through the entry door 34 and entry portal 90 to enter the cage 70. The iguanas 12 in the cage 70 are prevented from exiting the cage 70 via the entry portal 90 by the tines 54 if the trap 10 juxtaposed to the upstanding leg 92a of the cage frame member 92.

Figure 13:
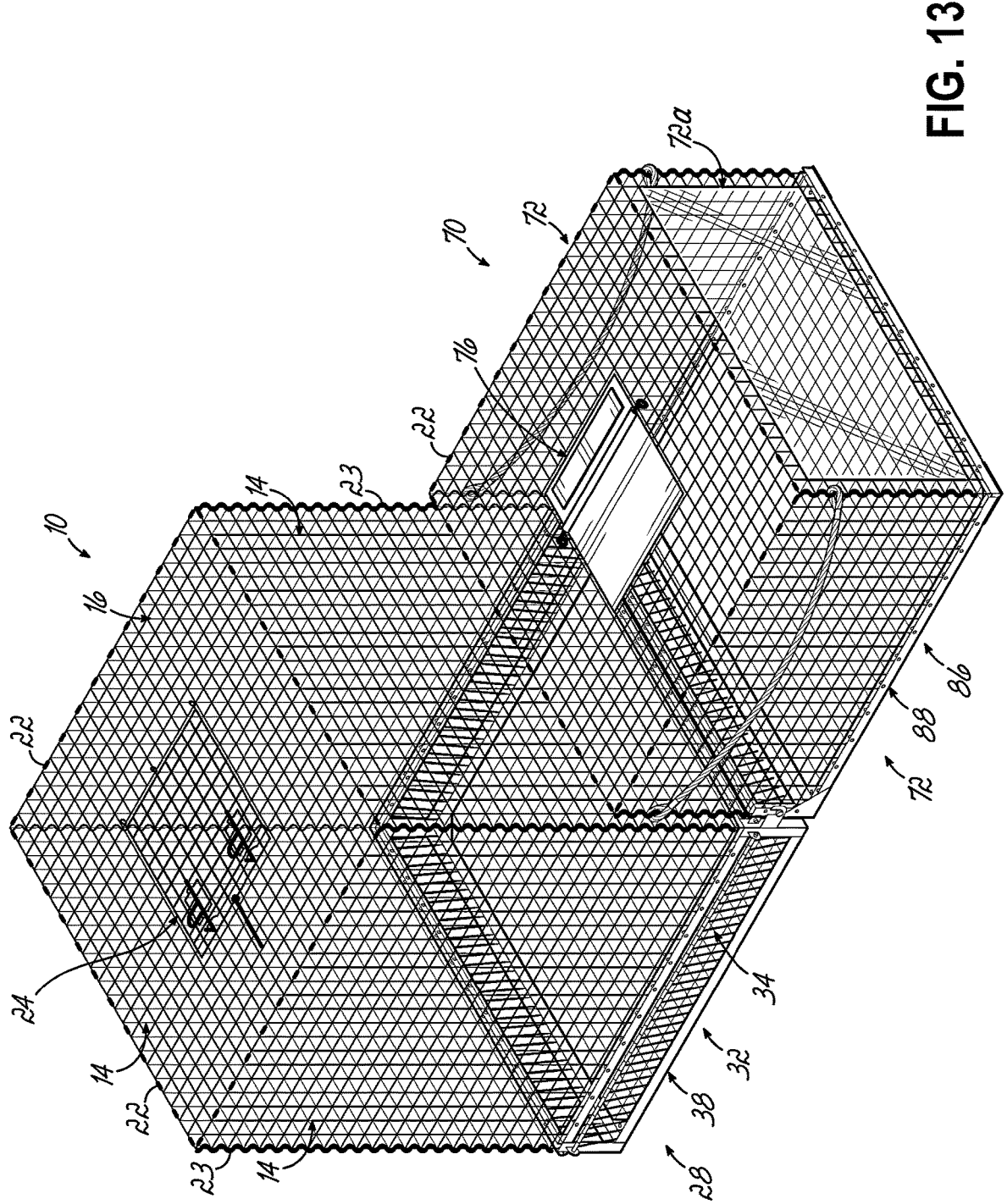
FIG. 13 is a perspective view of the coupled trap and auxiliary cage of FIGS. 12A-12B.

The auxiliary cage 70 mated with the trap 10 is shown in FIG. 13. The iguanas 12 in the trap 10 may be off-loaded by migration into the cage 70, which may then be de-coupled from the trap 10 for relocation of the iguanas 12 in the cage 70. The off-loading of the iguanas 12 in the trap 10 is accomplished without moving the trap 10 according to various embodiments of this invention. The entry portal 90 of the cage 70 may be temporarily blocked by bungee cords stretched across the entry portal 90 and hooked to the mesh 18 of the cage 70 or another means while transporting the iguanas 12 in the cage 70. A gusset 42 at each corner of the base frame 38 may have an aperture 44 through which a stake 46 or other anchor post may be inserted to at least temporarily secure the trap 10 to the ground surface there beneath.

The trap 10 may have any number of entrances and holding chamber entrances. An additional aspect of various embodiments of this invention is that the trap 10 does capture the target species (i.e. iguanas) but does not catch "non-target species" (i.e., raccoons, possums, cats, etc.). This is likely because the non-target species have paws (hands) that are different from the iguana's, and they are able to grab the tines (doors) and open them to escape.

In alternative embodiments of this invention, the auxiliary cage 70 may be connected to the trap 10 with a chute or tunnel that extends from the trap 10 into the auxiliary cage 70. The tunnel or chute may house the tines 54 and provide the alignment for connecting the trap 10 and the auxiliary cage 70. Traps 10 without the auxiliary cage 70 connected thereto will instead have another entrance.

Another aspect of some embodiments is the addition of one or more water bowls and filler bottles the trap 10. This allows for the possibility that the iguanas could be in the trap for up to a week and although they can survive without any issues, providing water is often considered more humane. The bowls can also collect rain and sprinkler water. When an iguana could be in the trap for extended periods (a few days), it's only humane to provide water. Various embodiments according to this invention may include a water bowl that is affixed to the trap so it can't be knocked over, a removable and/or refillable water bottle that attaches to the side of the trap with a drip feeder, or both.

Figure 14:
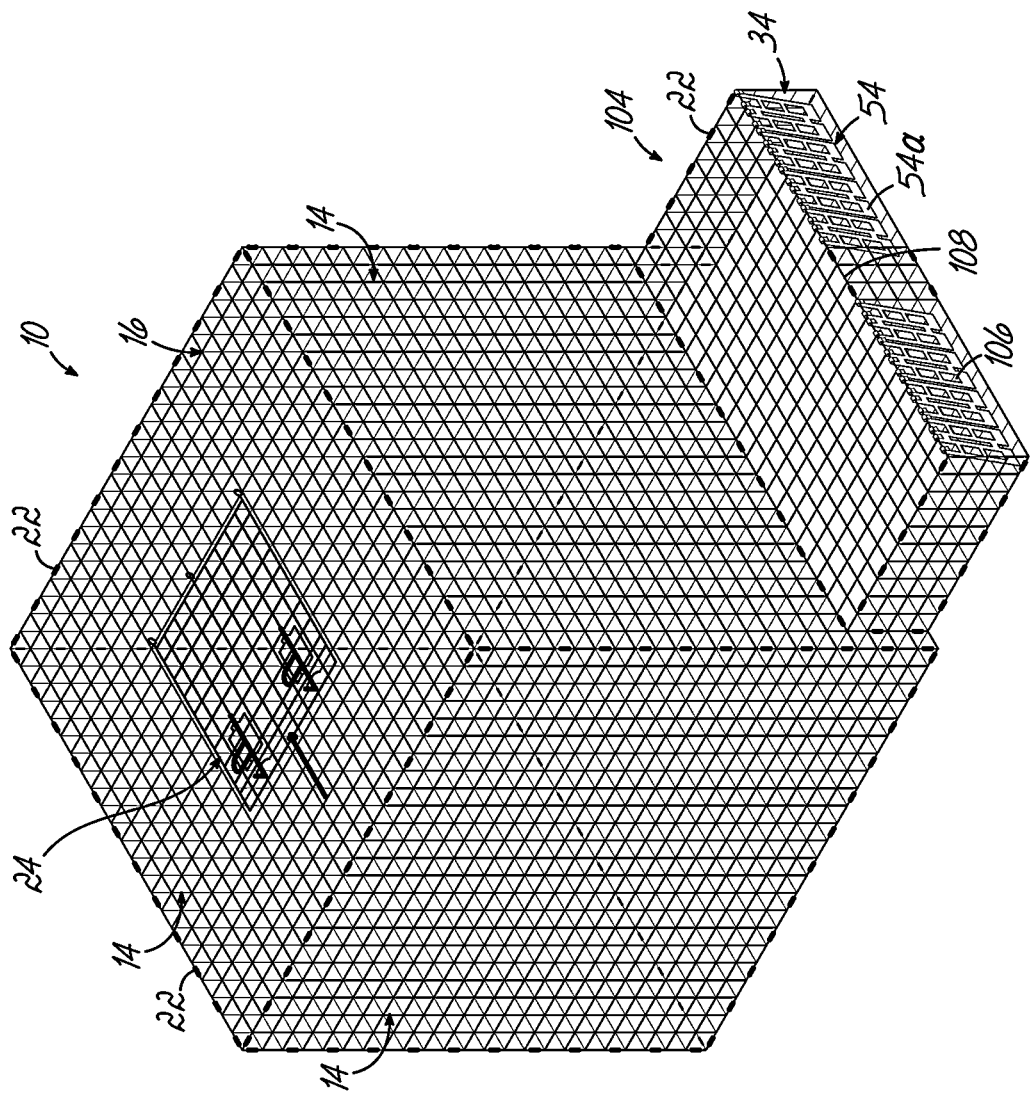
FIG. 14 is a perspective view of an alternative embodiment of the trap according to this invention.
Figure 15:
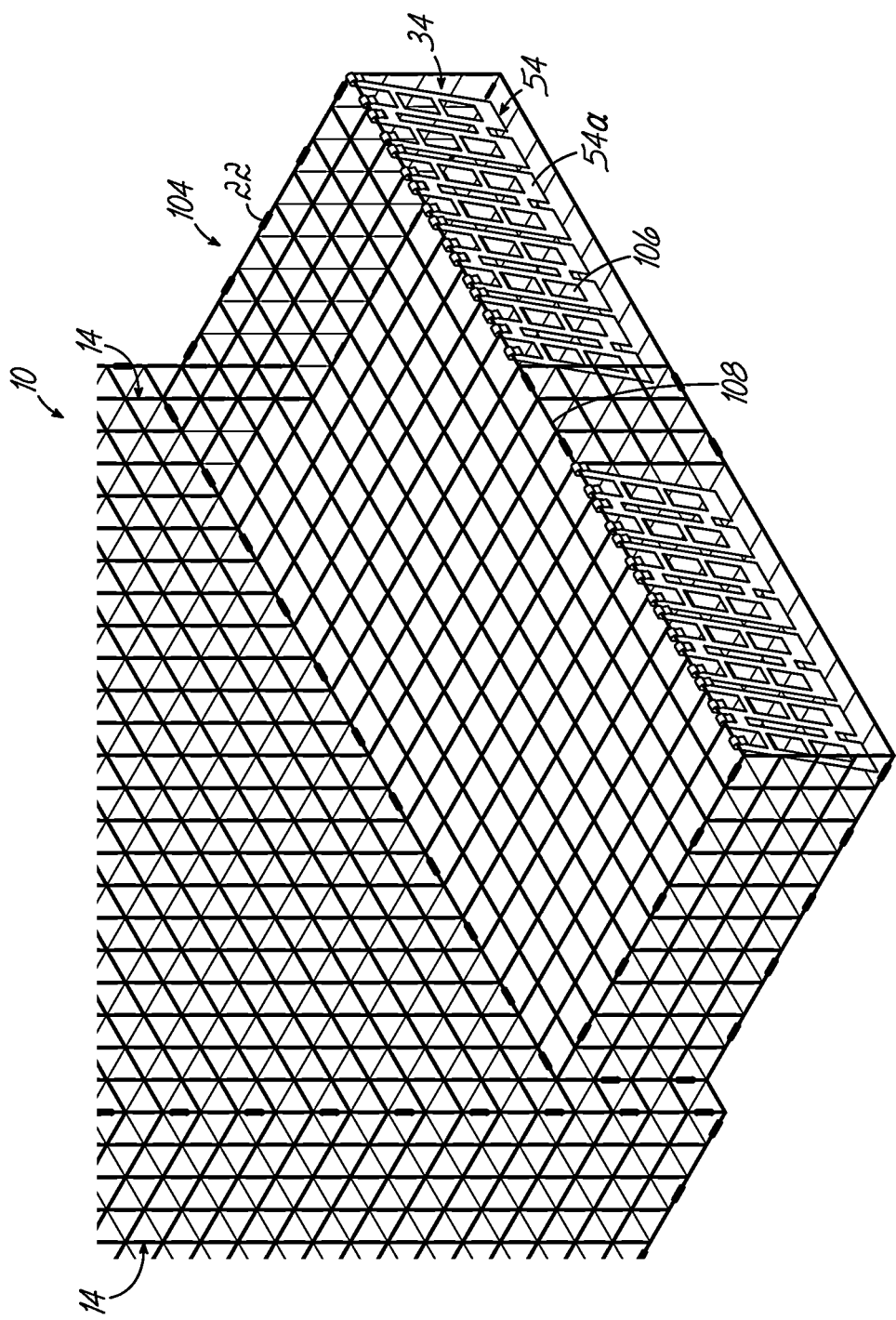
FIG. 15 is an enlarged view of a portion of the trap of FIG. 14.

An alternative embodiment of the trap 10 according to this invention is shown in FIGS. 14-15 in which the confinement volume for the iguana(s) 12 is defined by the trap 10 and is in communication with a chute 104 with the entry door 34 found in a free end of the chute 104. The chute 104 is in communication with the confinement volume of the trap 10. While the chute 104 and associated entry door 34 is located on one side of the trap 10, it will be understood by those of ordinary skill in the art that entry doors 34 and/or chutes 104 may be found on as many sides of the trap 10 as desired.

The tines 54 of the entry door 34 of the embodiment in FIG. 15 are formed in double width plates 54*a* with apertures 106 in each plate 54*a*. Each tine 54 is independently pivotal from the rest position shown in FIG. 15 relative to the other tines 54 in the entry door 34. Each tine 54 is pivotally mounted to an upper rung 108 at the free end of the chute 104 in this embodiment. Multiple entry doors 34 may be spaced apart from one another as shown in FIG. 15. The tines 54 of the trap 10 of FIGS. 14-15 when in the closed configuration as shown rest against a detent which prevents them from pivoting outwardly and allowing the captured iguanas from escaping the trap 10. The detent which prevents outward pivotal movement of the tines 54 may be the bottom of the chute 104 (FIG. 15) or another distinct obstruction or component of the trap 10. As is shown in FIGS. 14-15, the tines 54 when in the rest or closed position are not vertical but canted or inclined relative to the horizontal bottom of chute 104.

In various embodiments, the tines 54 are at about a 25 degree angle minimum facing in, for uneven ground. If the trap with doors on an uphill inclination, the tines 54 would hang open enough to allow for the iguanas to escape. With the tines 54 at the appropriate angel, the tines 54 create a "wedge" against the base of the trap 10 and don't require any component on the base to stop them from swing outwardly.

The tines 54 may act and pivot independently from each other, to conform to the shape or profile of the iguana as they enter the trap 10 making to more difficult for the iguana to reverse course or escape from the trap 10. The individual tines 54 according to various embodiments are removable for repair and/or replacement as needed.

In alternative embodiments of this invention, the side walls 14 may contain all the tines 54 which are attached directly to the mesh of the side walls 14 and are removable for repairs. The side walls 14 may connect directly to the base 28 which may be flat. The auxiliary cage 70 may have a similar construction. The auxiliary cage 70 may have a receiver for the chute/tunnel from the main trap 10, the water features, a locking door where the receiving chute enters so that when the auxiliary cage 70 is removed from the trap 10, the doors closes and locks to stop the iguanas from escaping and then a locking access door on top.

While this invention has been described in conjunction with a number of embodiments, those skilled in the art will recognize that certain modifications to the described embodiments still fall within the spirit and scope of the invention. Accordingly, the scope of this invention is not meant to be limited by the disclosure herein, but may be modified while maintaining its novel process and construction, as would be apparent to one of ordinary skill in the art.

What is claimed is:

1. A trap for a nuisance animal, the trap comprising:
   at least one sidewall;
   a top wall;
   a base adapted to be supported on a ground surface, the at least one sidewall extending upwardly from the base;
   a confinement volume bounded by the at least one sidewall, the top wall and the base; and
   a one-way entry door proximate an intersection of the at least one sidewall and the base, the one-way entry door allowing for entry of the nuisance animal into the confinement volume from outside of the trap, the one-way entry door inhibiting the nuisance animal from exiting the confinement volume once it is in the confinement volume.

2. The trap of claim 1 wherein the at least one sidewall further comprises:
   a plurality of serially connected sidewalls.

3. The trap of claim 1 wherein the one-way entry door is divided into a plurality of one-way entry door segments.

4. The trap of claim 1 wherein the one-way entry door further comprises:
   a plurality of downwardly oriented spaced tines.

5. The trap of claim 4 wherein each of the plurality of downwardly oriented tines is pivotally mounted about an axis spaced from the ground surface for independent pivotal movement relative to each other.

6. The trap of claim 4 wherein each of the plurality of downwardly oriented spaced tines is juxtaposed against a detent confronting the confinement volume.

7. The trap of claim 1 further comprising:
   an access door in the top wall providing access to the confinement volume.

8. The trap of claim 1 wherein the base further comprises:
   a bottom wall; and
   at least one base wall extending upwardly from the bottom wall wherein the one-way entry door is located in at least a portion of the at least one base wall.

9. The trap of claim 1 further comprising:
   an auxiliary cage selectively attachable to and detachable from the trap, the auxiliary cage defining an auxiliary confinement volume distinct from the confinement volume, the auxiliary confinement volume being in communication with the confinement volume.

10. The trap of claim 9 wherein the auxiliary cage further comprises:
an entry portal juxtaposed to at least a portion of the one-way entry door of the trap.

11. The trap of claim 10 wherein at least a portion of the one-way entry door is reconfigurable to allow for entry of the nuisance animal into the auxiliary confinement volume from the confinement volume of the trap, the at least a portion of the one-way entry door inhibiting the nuisance animal from exiting the auxiliary confinement volume once it is in the auxiliary confinement volume.

12. The trap of claim 11 wherein a select number of the plurality of tines associated with the at least a portion of the one-way entry door are juxtaposed against an auxiliary face confronting the auxiliary confinement volume of an auxiliary detent of the auxiliary cage.

13. The trap of claim 10 further comprising:
a bracket to releasably attach the auxiliary cage to the trap.

14. The trap of claim 10 wherein a size of the confinement volume is different from a size of the auxiliary confinement volume.

15. The trap of claim 9 further comprising:
a chute joining the auxiliary cage to the trap and providing for movement of the nuisance animal from the trap to the auxiliary cage.

16. A trap for a nuisance animal, the trap comprising:
a plurality of serially connected sidewalls;
a top wall;
a base adapted to be supported on a ground surface, the plurality of serially connected sidewalls extending upwardly from the base;
a confinement volume bounded by the plurality of serially connected sidewalls, the top wall and the base; and
a one-way entry door proximate an intersection of the plurality of serially connected sidewalls and the base, the one-way entry door allowing for entry of the nuisance animal into the confinement volume from outside of the trap, the one-way entry door inhibiting the nuisance animal from exiting the confinement volume once it is in the confinement volume;
wherein the one-way entry door further comprises a plurality of downwardly oriented spaced tines each of which is pivotally mounted about an axis spaced from the ground surface and is juxtaposed against a detent confronting the confinement volume.

17. The trap of claim 16 further comprising:
an auxiliary cage selectively attachable to and detachable from the trap, the auxiliary cage defining an auxiliary confinement volume distinct from the confinement volume, the auxiliary confinement volume being in communication with the confinement volume.

18. The trap of claim 17 wherein the at least a portion of the one-way entry door is reconfigurable to allow for entry of the nuisance animal into the auxiliary confinement volume from the confinement volume of the trap, the at least a portion of the one-way entry door inhibiting the nuisance animal from exiting the auxiliary confinement volume once it is in the auxiliary confinement volume.

19. The trap of claim 18 wherein a select number of the plurality of tines associated with the at least a portion of the one-way entry door are juxtaposed against an auxiliary face confronting the auxiliary confinement volume of an auxiliary detent of the auxiliary cage.

20. The trap of claim 16 further comprising:
a chute joining the auxiliary cage to the trap and providing for movement of the nuisance animal from the trap to the auxiliary cage.

21. The trap of claim 1 wherein the one-way entry door inhibits the nuisance animal from exiting the confinement volume and allows for animals other than the nuisance animal to exit the confinement volume.

22. The trap of claim 4 wherein the plurality of downwardly oriented spaced tines form an obtuse angle with the base.

23. The trap of claim 4 wherein each of the plurality of downwardly oriented spaced tines further comprises:
a plate with a plurality of apertures therein such that non-nuisance animals in the trap may grasp and raise the plate to escape the trap.

24. The trap of claim 16 wherein the one-way entry door inhibits the nuisance animal from exiting the confinement volume and allows for animals other than the nuisance animal to exit the confinement volume.

25. The trap of claim 16 wherein the plurality of downwardly oriented spaced tines form an obtuse angle with the base.

26. The trap of claim 16 wherein each of the plurality of downwardly oriented spaced tines further comprises:
a plate with a plurality of apertures therein such that non-nuisance animals in the trap may grasp and raise the plate to escape the trap.

* * * * *